United States Patent [19]

Noda et al.

[11] Patent Number: 4,882,725

[45] Date of Patent: Nov. 21, 1989

[54] MULTIPLEX TRANSMISSION METHOD AND APPARATUS

[75] Inventors: Tsutomu Noda; Takatoshi Shirosugi, both of Yokohama; Nobutaka Hotta, Kamakura; Akihide Okuda, Yokohama, all of Japan

[73] Assignees: Hitachi, Ltd., Tokyo; Hitachi Video Engineering, Incorporated, Yokohama, both of Japan

[21] Appl. No.: 150,203

[22] Filed: Jan. 29, 1988

[30] Foreign Application Priority Data

| Jan. 30, 1987 | [JP] | Japan | 62-18359 |
| Jan. 30, 1987 | [JP] | Japan | 62-18360 |
| Jan. 30, 1987 | [JP] | Japan | 62-18398 |
| Jan. 30, 1987 | [JP] | Japan | 62-18399 |
| Jul. 29, 1987 | [JP] | Japan | 62-187510 |

[51] Int. Cl.$^4$ ............................................. H04J 9/00
[52] U.S. Cl. ........................................ 370/11; 370/20; 358/143; 358/343
[58] Field of Search ............... 370/11, 20; 375/39, 375/50; 358/343, 143, 144

[56] References Cited

U.S. PATENT DOCUMENTS 4,404,532 9/1983 Welti ...................................... 370/11
4,410,911 10/1983 Field et al. ............................. 370/20

OTHER PUBLICATIONS

"Receiver for DBS with Digital Audio Signals", IEEE Trans CE-30, No. 3 (Aug. 1984); T. Arai; pp. 266–270.
"Broadcasting System"; Broadcasting Technical Library 2; Japan Broadcasting Publication Co.; Jan. 1983, pp. 205–208.

Primary Examiner—Joseph A. Orsino
Assistant Examiner—Frank M. Scutch, III
Attorney, Agent, or Firm—Antonelli, Terry & Wands

[57] ABSTRACT

A multiplex transmission method using especially a vestigial-sideband amplitude-modulated carrier modulated by a video signal. The method includes modulating a carrier having a quadrature phase with respect to an amplitude-modulated carrier by a multiplex-transmitted signal such as a digital-coded signal with a lower level as compared with the amplitude-modulated carrier, suppressing signal components of a signal obtained by modulating the carrier by a multiplex-transmitted signal, which is located near the carrier frequency, combining the result with the amplitude-modulated carrier, and thereafter transmitting the combined signal.

50 Claims, 32 Drawing Sheets

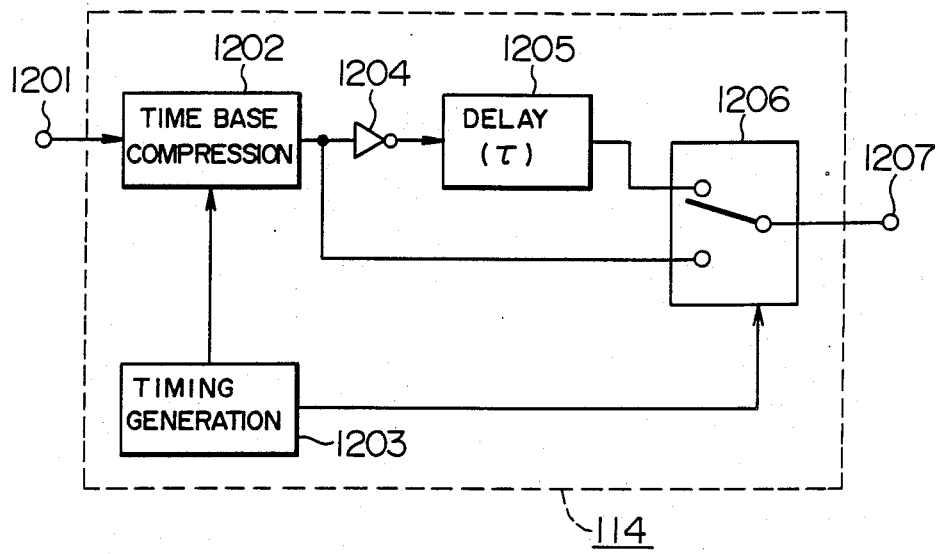
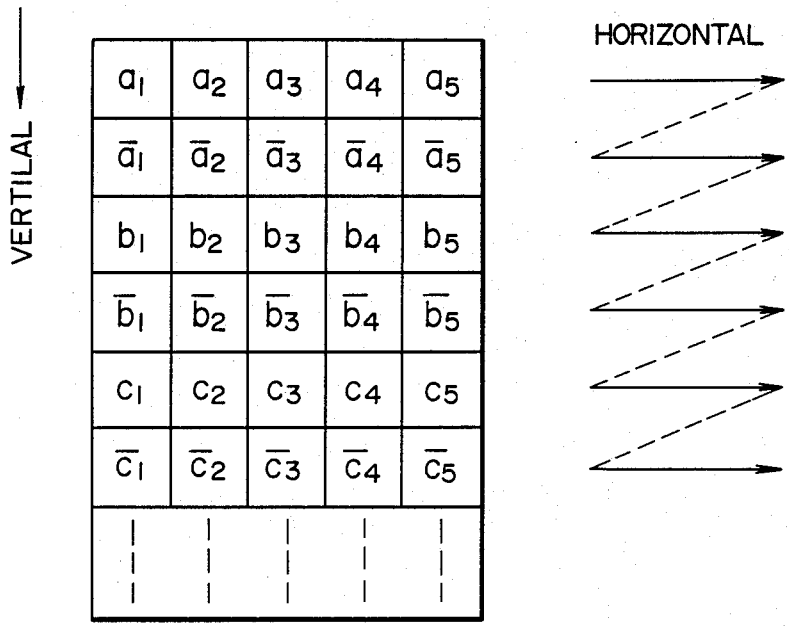
FIG. 14

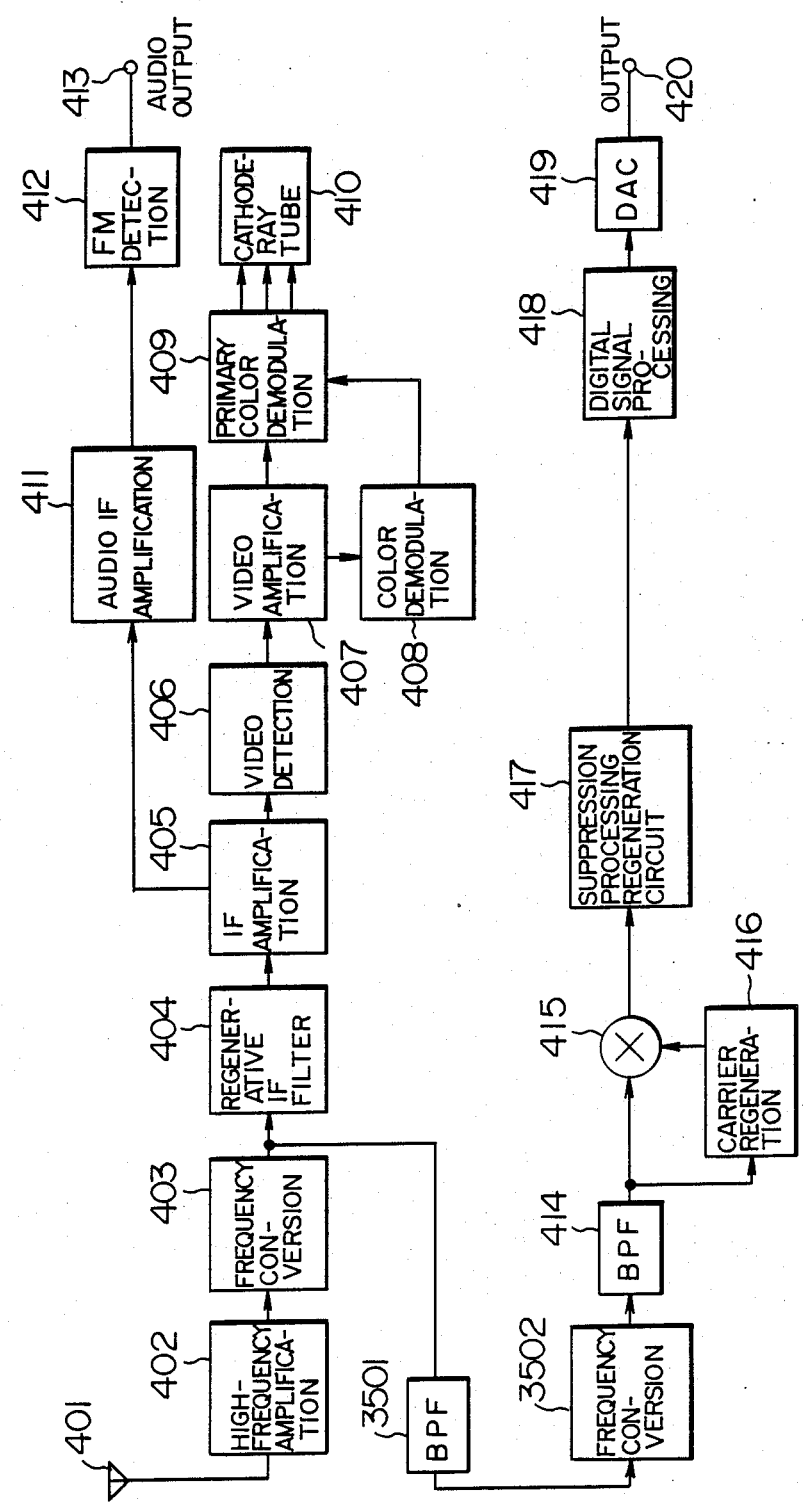
F I G. 35

MULTIPLEX TRANSMISSION METHOD AND APPARATUS

BACKGROUND OF THE INVENTION

The present invention relates to a multiplex transmission system, and in particular to a transmission system efficient for transmitting digital-coded audio signals, and the like, multiplexed on video signals, and to a signal generation apparatus and signal regeneration apparatus for such transmissions.

In the past, a method for transmitting digital-coded audio signals (hereafter referred to as PCM audio signals) multiplexed on video signals was reported in T. Arai, et al.: Receiver for DBS with Digital Audio Signals, IEEE TRANS., CE-30 No. 3 (Aug. 1984). The contents of this report will now be described. A subcarrier of 5.7272 MHz is multiplexed on a video signal of a NTSC system ranging to 4.2 MHz by using different frequencies. The subcarrier is QPSK-modulated by PCM audio signals. In this system, however, the subcarrier frequency is located outside the band of current television. Therefore, it is impossible to put this system in force while assuring compatibility with current television.

A method for multiplexing another signal onto current television is described in Broadcasting Technical Library 2 "Broadcasting System" edited by the Japan Broadcasting Corporation and published by the Japan Broadcasting Publication Corporation in January 1983, pp. 205 to 208. However, a system for obtaining a transmission rate not less than approximately 1M bits/second, which is required to transmit high quality PCM voices, is not described.

In the above described prior art, transmission of signals having a transmission rate of approximately 1 M bits/sec multiplexed on a current television signal was not considered. Accordingly, there was a problem that multiplex transmission of high quality PCM voices was impossible.

SUMMARY OF THE INVENTION

An object of the present invention is to provide a transmission system for transmitting a signal multiplexed on a signal amplitude-modulated and transmitted, signal generation apparatus and signal regeneration apparatus for such transmission. In particular, an object of the present invention is to provide a transmission system for transmitting PCM voices multiplexed on a television signal, and to signal generation apparatus and its signal regeneration apparatus for such transmission. The transmission system, the signal generation apparatus and the signal regeneration apparatus reduce interference between the television signal and the PCM voice signal.

The above described object is attained by modulating a carrier having a quadrature phase, with respect to an amplitude-modulated carrier, by a multiplex-transmitted signal with a lower level as compared with the amplitude-modulated carrier, combining it with the amplitude-modulated carrier and thereafter transmitting the combined signal, and suppressing signal components of the signal obtained by modulating the carrier with a multiplex-transmitted signal, which are located near the carrier frequency.

Since the carrier having a quadrature phase with respect to the amplitude-modulated carrier is modulated by a multiplex-transmitted signal and thereafter combined with the amplitude-modulated carrier to be transmitted, the amplitude-modulated signal and the multiplex-transmitted signal are regenerated in an apparatus for receiving and regenerating the transmission signal by synchronously detecting the transmission signals by means of respective carriers regenerated from the transmission signal. In this case, interference between regenerated signals is very slight. Even if the amplitude-modulated transmission signal is regenerated by a pseudo-synchronous detection system or the like, the interference between regenerated signals is slight because the carrier modulated by the multiplex-transmitted signal is combined with a low level signal and the signal components near the carrier frequency are suppressed.

BRIEF DESCRIPTION OF THE DRAWINGS

FIG. 12 is a block diagram of an example of a spectrum suppression processing circuit of a transmission signal generation apparatus according to the present invention.

FIG. 14 schematically shows a diagram of an example of a transmission data pattern according to the present invention as illustrated in FIGS. 12 and 13.

FIG. 35 is a block diagram of a further example of a transmission signal regeneration apparatus according to the present invention.

DESCRIPTION OF THE PREFERRED EMBODIMENTS

Figure 1:
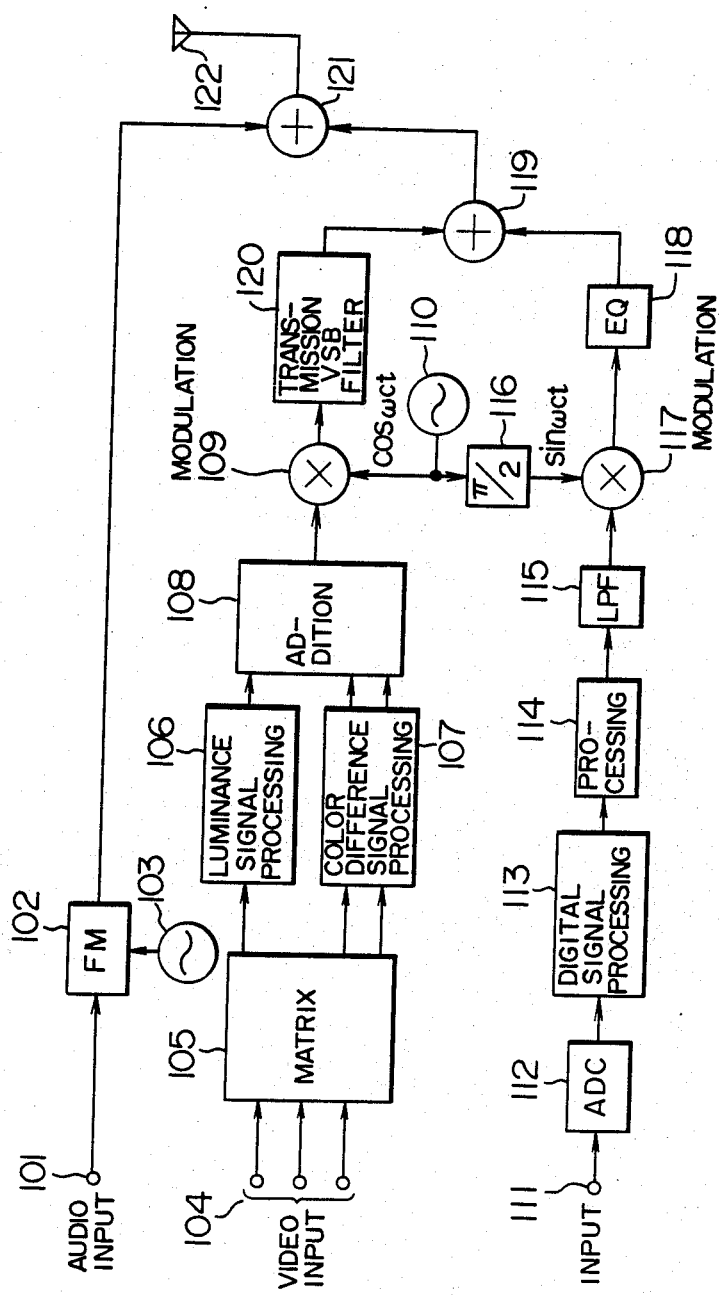
FIG. 1 is a block diagram of an example of a transmission signal generation apparatus according to the present invention.

Embodiments of the present invention will now be described by referring to drawings. FIG. 1 shows a block diagram of an embodiment of a transmission signal generation apparatus for television signal transmission according to the present invention.

Numeral 101 denotes an audio signal input terminal, 102 an FM modulator, 103 an audio signal carrier generation circuit, 104 a video signal input terminal, 105 a matrix circuit, 106 a luminance signal processing circuit, 107 a color difference signal processing circuit, 108 an adder circuit, 109 a video modulation circuit, 110 a video signal carrier generation circuit, 111 an input terminal for an audio signal transmitted in a digital code form, 112 an analog-digital conversion circuit (hereafter referred to as ADC), 113 a digital signal processing circuit, 114 a spectrum suppression processing circuit, 115 a low-pass filter, 116 a phase-shifting circuit, 117 a modulation circuit, 118 an equalizer, 119 an adder circuit, 120 a transmission VSB filter for vestigial-sideband amplitude modulation, 121 an adder, and 122 an antenna.

The carrier for audio signal generated in the audio signal carrier generation circuit 103 is frequency-modulated in the FM modulator 102 by an audio signal supplied to the audio signal input terminal 101. In the matrix circuit 105, three primary color signals R, G and B of a video signal supplied to the video signal input terminal 104 are divided into a luminance signal and color difference signals. These signals are processed respectively in the luminance signal processing circuit 106 and the color difference signal processing circuit 107. The resultant signals are added in the adder circuit 108 to be processed into a composite video signal of the NTSC system or the like. By the video signal thus processed, the carrier for video signal generated in the video signal carrier generation circuit 110 is amplitude-modulated in the video modulation circuit 109. The signal thus modulated is limited to the television transmission bandwidth by the transmission VSB filter 120 for vestigial-sideband amplitude modulation, added in the adder circuit 121 to the audio signal carrier modulated by the audio signal, and transmitted by the antenna 122. The transmission signal generation apparatus section of the current terrestrial television has heretofore been described.

Portions relating to the present invention will now be described. Multiplex-transmitted audio signals supplied to the input terminal 111 are converted into digital codes by the ADC 112. The the signal thus converted undergoes so-called digital signal processing in the digital signal processing circuit 113. That is to say, codes for error detection and error correction are added to the signal so that errors caused during the transmission may be detected and corrected in the receiver on the regeneration side, and interleave processing is applied to the signal. In the spectrum suppression processing circuit 114, low frequency components among the components of the processed signal are suppressed. Unnecessary high frequency components of the signal which has undergone suppression processing are removed by the low-pass filter 115. The carrier for the video signal generated in the video signal carrier generation circuit 110 is varied in phase by 90 degrees in the phase-shifting circuit 116 and then modulated in the modulation circuit 117 by the signal which is outputted by the low-pass filter 115. The signal thus modulated is compensated in amplitude characteristics by the equalizer 118. In the adder circuit 119, the signal thus compensated is added to the modulated carrier for video signal to be transmitted from the antenna 122. The amplitude characteristics of the equalizer 118 for compensation are symmetrical to the amplitude characteristics of an IF Nyquist filter disposed at the intermediate frequency stage of the video signal of the television receiver with respect to the frequency of the video carrier. The equalizer 118 is disposed for compensating, at the transmission side, the change of the multiplex transmission wave from the quadrature phase caused by the IF Nyquist filter of the television receiver. The video signal which has been passed through the IF Nyquist filter of the television receiver and which has not yet been detected has a phase relationship such that the modulated wave of the multiplex-transmitted signal has a quadrature phase with respect to the video signal carrier. If less multiplex signal is added to the video signal in the adder circuit 119, interference from the multiplex signal onto the video signal detected by the television receiver can be reduced.

Figure 2:
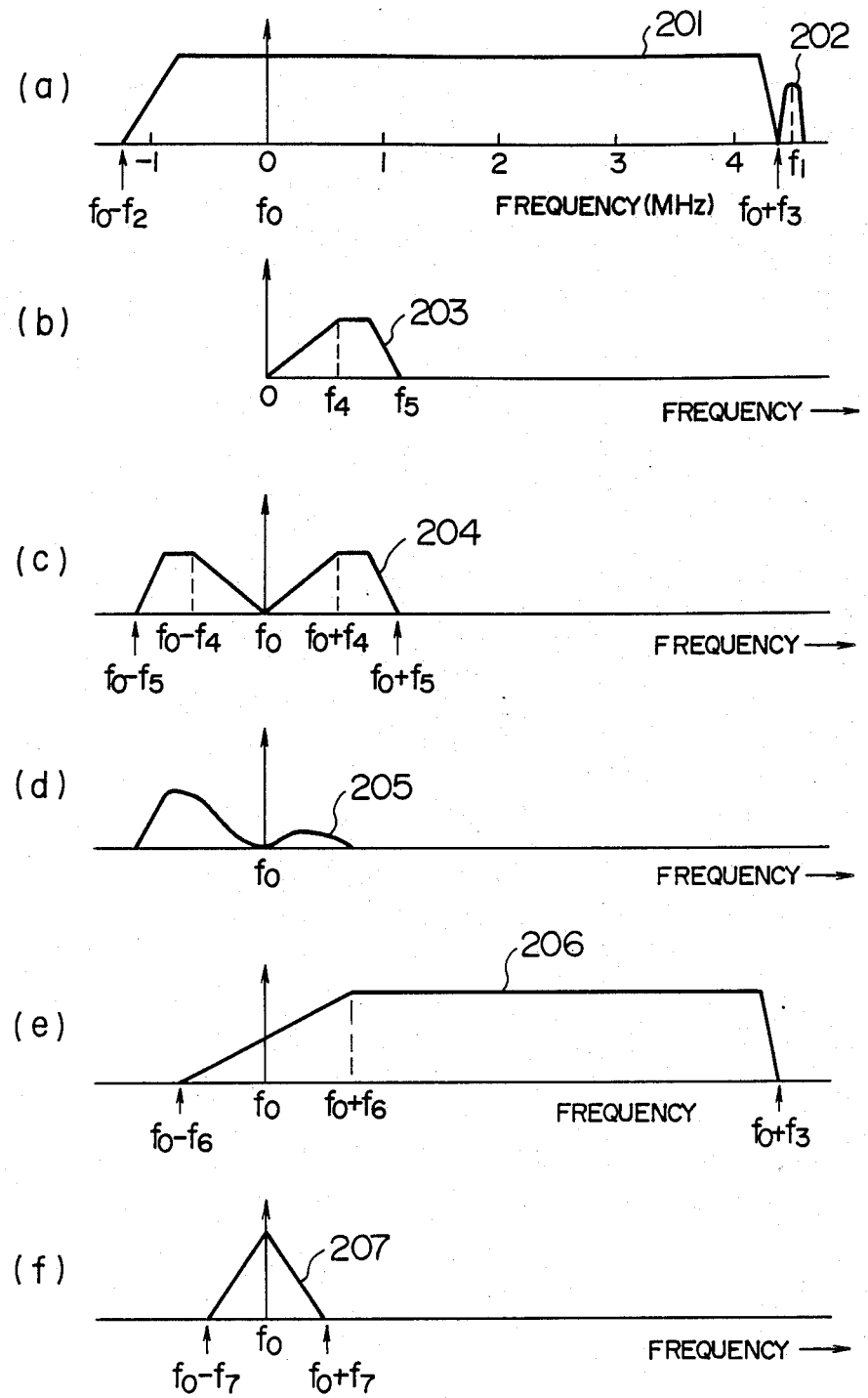
FIG. 2 depicts waveforms showing examples of spectra of a transmission signal according to the present invention.

FIG. 2 shows a spectrum diagram of the transmission signal and the like generated in the circuit illustrated in FIG. 1. Numeral 201 denotes a spectrum of the transmission signal of the video signal, 202 a spectrum of the FM-modulated and transmitted audio signal, 203 a spectrum of the multiplex signal which has undergone the spectrum suppression processing and elimination of unnecessary high frequency components, 204 a spectrum of the multiplex signal which has been modulated, 205 a spectrum of the multiplex signal having amplitude characteristics compensated by the equalizer 118, 206 Nyquist filter characteristics of the receiver, and 207 amplitude characteristics of a band-pass filter for carrier generation of a general television receiver of a pseudo-synchronous detection system.

In a lower frequency range not higher than $f_0-f_2$, and a higher frequency range not lower than $f_0+f_3$, where $f_0$ denotes the carrier frequency of the video signal, the spectrum 201 of the transmission signal of the video signal is attenuated by amplitude characteristics of the VSB filter 120. The FM-modulated and transmitted audio signal spectrum 202 is located around the audio signal carrier $f_1$. On the other hand, the multiplex-transmitted signal has a spectrum 203 in which low frequency components not higher than a frequency $f_4$ are suppressed by the spectrum suppression processing circuit 114, and unnecessary high frequency components, not lower than a frequency $f_5$ are eliminated. This is the so-called spectrum of the baseband signal which has been processed. As represented by the spectrum 204, the spectrum obtained as a result of modulation performed in the modulation circuit 117 is symmetrical with respect to $f_0$. The amplitude characteristics of the equalizer 118 and the IF Nyquist filter characteristics 206 of the television receiver, having a slope in the frequency range from $f_0-f_6$ to $f_0+f_6$, are symmetrical with respect to the video carrier frequency $f_0$. As the frequency becomes higher, therefore, the spectrum of the output signal of the equalizer 118 is attenuated more strongly as represented by the spectrum 205. In the adder circuit 119, the modulated wave of the video signal represented by the spectrum 201 and the modulated wave of the multiplex-transmitted signal are added. Further, the resultant signal and the modulated wave of the audio signal represented by the spectrum 202 are added in the adder circuit 121 to be transmitted.

Figure 3:
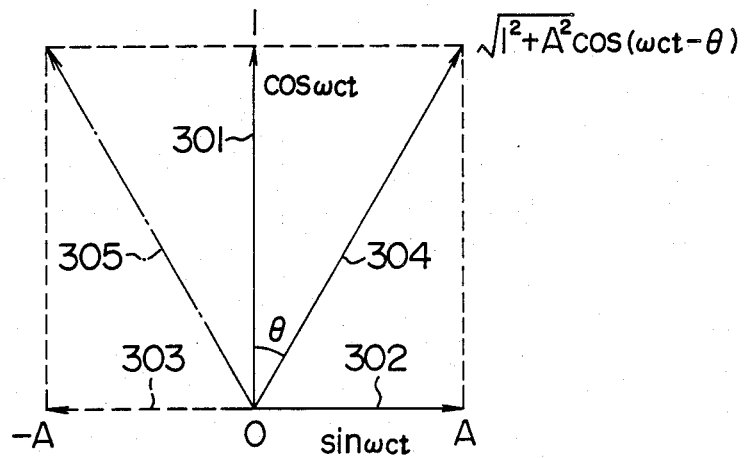
FIG. 3 is a vector diagram of a transmission signal according to the present invention.

FIG. 3 is a vector diagram showing the phase relation between the modulated wave of the video signal and the modulated wave of the multiplex-transmitted signal. Numeral 301 denotes a vector of the video signal carrier. Numerals 302 and 303 denote vectors of modulated waves of signals to be multiplex-transmitted. Numerals 304 and 305 denote their composite vectors. For a frequency existing in the range of $\pm f_2$ with respect to the video carrier frequency $f_0$, the modulated wave of the video signal is a general amplitude-modulated wave and is represented by the vector 301. By the multiplex-transmitted signal existing in the frequency range not higher than $f_2$, the quadrature carrier is modulated to amplitudes A and $-A$ in response to digital codes "1" and "0" as represented by vectors 302 and 303, respectively. Assuming that the amplitude of the carrier of the video signal is unity, the composite signal E to be transmitted can be represented as $$E = \cos \omega_c t \pm A \sin \omega_c t \qquad (1)$$

where $\omega_c$ represents the angular frequency of the video carrier and t represents time. By using composite vectors 304 and 305 of FIG. 3, E can be written as $$E = \sqrt{1 + A^2} \cos(\omega_c t \mp \theta) \qquad (2)$$

where $$\theta = \tan^{-1}(A). \qquad (3)$$

The interference caused on the received and regenerated signal of a television receiver by the multiplex-transmitted signal will now be described. If the video signal detection circuit is a synchronous detection circuit, the detection output signal of the video signal is a signal including only coefficients of $\cos \omega_c t$ (including only the video signal) irrespective of the value of A. In principle, therefore, interference is not caused. If the video signal detection circuit is an envelope detection circuit, the interference caused on the detection output signal of the video signal changes with the value of A. The lower the value of A, the less interference. Assuming that A is 0.1, for example, it follows that $$\begin{aligned} E &= \sqrt{1 + A^2} \\ &\approx 1.005. \end{aligned} \qquad (4)$$

This indicates that the signal corresponding to 0.005 (approximately $-46$ dB) with respect to unity is affected. We consider that this interference does not pose a practical problem because the resultant SN ratio of the video signal is not lower than 40 dB. On the other hand, the interference caused on the digital-coded voices by the video signal is excluded by using a synchronous detection circuit in the detection circuit for regenerating digital-coded voices. We now consider whether the multiplex-transmitted signal is reproduced at the receiver or not under the condition that the level of the multiplex-transmitted signal is low. For this purpose, we pay attention to the transmission SN ratio of the multiplex-transmitted signal. In case the SN ratio of the video signal is 40 dB, the transmission SN ratio of the digital-coded audio signal becomes 46 dB because the transmission bandwidth of the digital-coded audio signal is approximately one fourth the bandwidth of the video signal. Since the signal is transmitted with the value of A being 0.1, the transmission SN becomes 26 dB. For a typical binary signal, the SN ratio of a digital signal is related to the bit error rate by values of 17.4 dB and $10^{-4}$. Therefore, this signal having an SN ratio of 26 dB is good enough in quality to be regenerated.

The band-pass filter of the carrier regeneration circuit for pseudo-synchronous detection of a television receiver having a video signal detection circuit of pseudo-synchronous detection system passes frequencies in the range of $f_0 \pm f_7$, as depicted by the amplitude characteristics 207. In the spectrum 205 of the signal which has undergone processing such as the spectrum suppression processing and modulation to be multiplex-transmitted, signal components existing in the frequency band of $f_0 \pm f_4$ are suppressed. Accordingly, the detected video signal is not significantly interfered with by the multiplex signal.

In the embodiment described above, the multiplex-transmitted signal undergoes spectrum processing, and the multiplex level is so set as to be lower than the video signal. As a result, interference caused on the television can advantageously be reduced.

Figure 4:
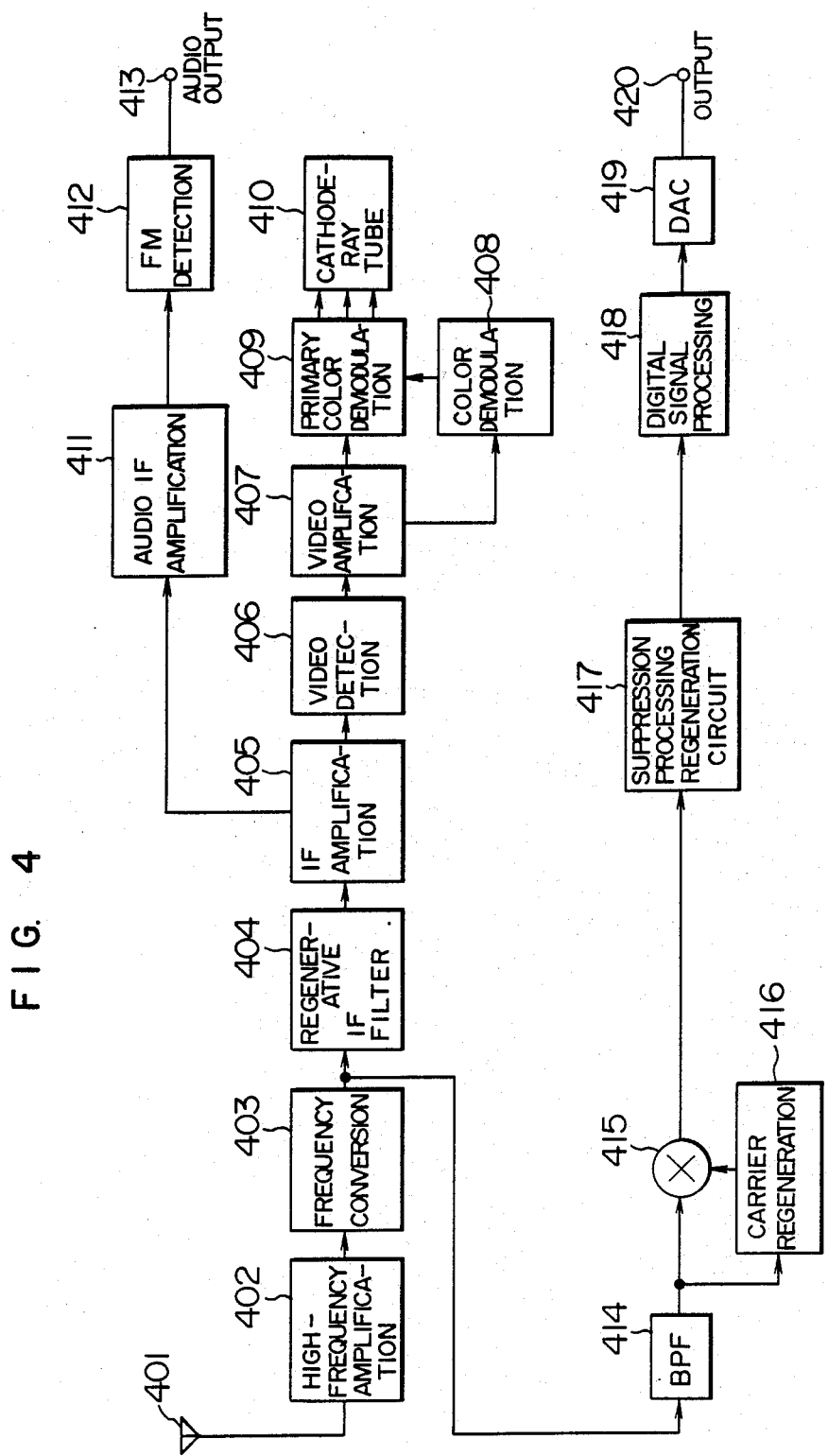
FIG. 4 is a block diagram of an example of a transmission signal regeneration apparatus according to the present invention.

FIG. 4 is a block diagram of an embodiment of a television transmission signal regeneration apparatus according to the present invention. Numeral 401 denotes an antenna, 402 a high-frequency amplifying circuit, 403 a frequency conversion circuit, 404 an IF Nyquist filter, 405 an intermediate frequency amplifying circuit, 406 a video signal detection circuit, 407 a video signal amplifying circuit, 408 a color difference signal demodulation circuit, 409 a primary color signal demodulation circuit, 410 a cathode-ray tube, 411 an audio intermediate frequency amplifying circuit, 412 an audio FM detection circuit, 413 an audio signal output terminal, 414 a band-pass filter, 415 a synchronous detection circuit, 416 a carrier regeneration circuit, 417 a spectrum suppression processing signal regeneration circuit, 418 a digital signal processing circuit, 419 a digital-analog conversion circuit (hereafter abbreviated as DAC), and 420 an output terminal for an audio signal which is digitally coded, transmitted, and regenerated.

After a television signal inputted from the antenna 401 has been amplified in the high-frequency amplifying circuit 402, it is converted into a demodulation intermediate frequency signal in the frequency conversion circuit 403. The signal thus converted is passed through the IF Nyquist filter 404 and amplified in the intermediate frequency amplifying circuit 405. Station selection is performed by changing the oscillation frequency of a local oscillator located within the frequency conversion circuit 403. In the video signal detection circuit 406, the video signal is detected from the signal amplified in the intermediate frequency amplifying circuit 405. The resultant video signal is amplified in the video signal amplifying circuit 407. From this amplified signal, the color difference signal is obtained in the color difference signal demodulation circuits 408. The resultant signal and the output signal of the video signal amplifying circuit 407 are converted into three primary color signals R, G and B in the primary color signal demodulation circuit 409. The three primary color signals are supplied to the cathode-ray tube 410 to display images on the cathode-ray tube. Among output signals of the intermediate frequency amplifying circuit 405, the audio band signal is amplified in the audio intermediate frequency amplifying circuit 411. The output signal of the circuit 411 is FM-detected in the audio FM detection circuit 412, resulting in an audio signal. The audio signal is outputted from the audio signal output terminal 413. The regeneration apparatus section of the current television has heretofore been described.

Portions relating to the present invention will now be described. From the signal converted into an intermediate frequency signal in the frequency conversion circuit 403, the digital-coded and multiplex-transmitted signal of audio signal band is extracted by the band-pass filter 414. In the synchronous detection circuit 415, the extracted signal is synchronous-detected with the carrier regenerated in the carrier regeneration circuit 416, the quadrature multiplex-transmitted signal being detected and demodulated. The demodulated signal is processed in the spectrum suppression processing signal regeneration circuit 417 to restore the signal as it was before the spectrum suppression processing. Thereafter, the error of the signal caused during its transmission is detected and corrected in the digital signal processing circuit 418. The digital signal thus corrected is restored to the analog signal in the DAC 419. The analog signal is outputted from the output terminal 420.

As heretofore described, a regeneration apparatus corresponding to the transmission signal generation apparatus is disposed in the present embodiment. This results in an effect that the multiplex-transmitted signal can be demodulated.

Figure 5:
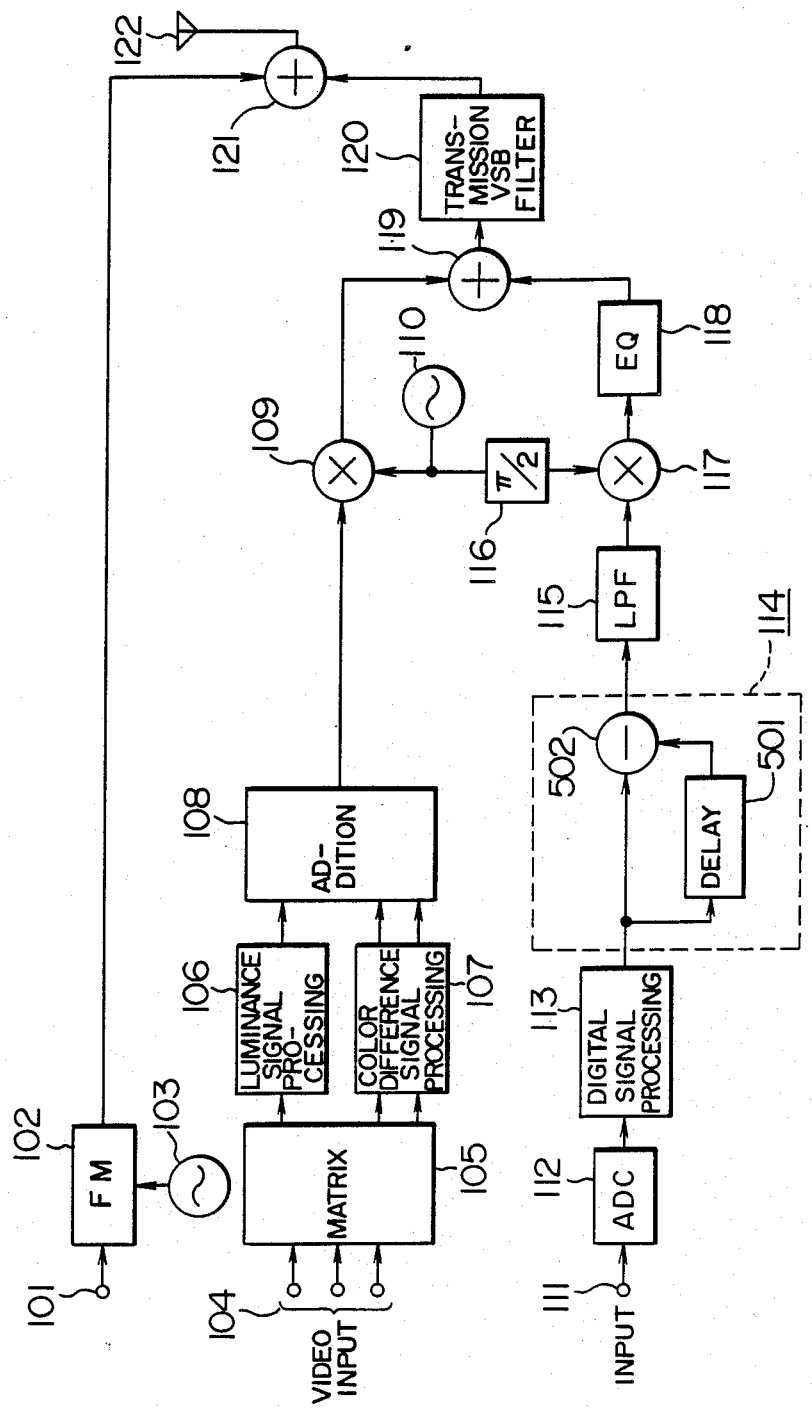
FIG. 5 is a block diagram of another example of a transmission signal generation apparatus according to the present invention.

FIG. 5 shows another example of a block diagram of an embodiment of a transmission signal generation apparatus of television signal transmission according to the present invention. The same symbols as those of FIG. 1 represent identical functions. Numeral 114 denotes a spectrum suppression processing circuit. Numerals 501 and 502 denote a delay circuit and a subtraction circuit, respectively. A concrete example of the spectrum suppression processing circuit 114 is represented by the delay circuit 501 and the subtraction circuit 502.

Figure 6:
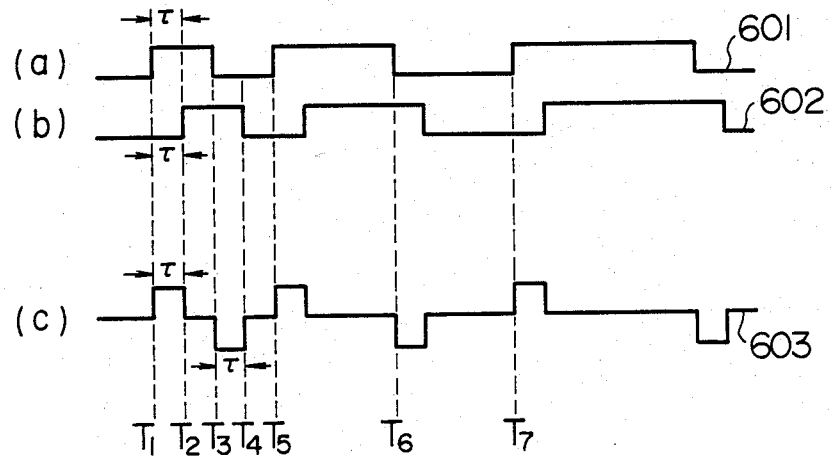
FIG. 6 depicts an example of waveform diagrams used in explaining the operation of the apparatus of FIG. 5.

FIG. 6 is a waveform diagram for explaining the operation of FIG. 5. Numeral 601 denotes an inputted typical binary digital data, numeral 602 an output waveform of the delay circuit 501, and numeral 603 denotes an output waveform of the subtraction circuit 502. The delay time $\tau$ is defined to be equal to or shorter than the minimum reversal interval T of digital data as represented by $$\tau \leq T. \tag{5}$$

If $\tau$ is made equal to T, the required transmission band is not increased. FIG. 6 shows its example. In the subtraction circuit 502, a waveform 602, which is the output of the delay circuit 501, is subtracted from the inputted general binary digital data 601, resulting in an output waveform 603. The waveform 603 changes to "High" by a rising edge of digital data 601 such as that at time $T_1$, $T_5$ and $T_7$ and remains "High" for time $\tau$. At instants $T_3$, $T_6$ and so on, the waveform 603 changes to "Low" and remains "Low" for time $\tau$. In other periods such as the period lasting from time $T_2$ to time $T_3$, and the period lasting from time $T_4$ to time $T_5$, the waveform 603 assumes the intermediate level. As compared with the data 601, low-frequency components of the waveform 603 are reduced. The carrier which is the output of the phase-shifting circuit 116 is modulated in the modulation circuit 117 so as to become $+A$, $-A$ and non-modulation state. Accordingly, components of the modulation wave of the multiplex-transmitted signal after modulation located near the carrier frequency are suppressed.

In the present embodiment, components of the multiplex-transmitted signal located near the carrier frequency are suppressed. This results in an effect that the interference caused on the television by the multiplex-transmitted signal can be reduced.

Figure 7:
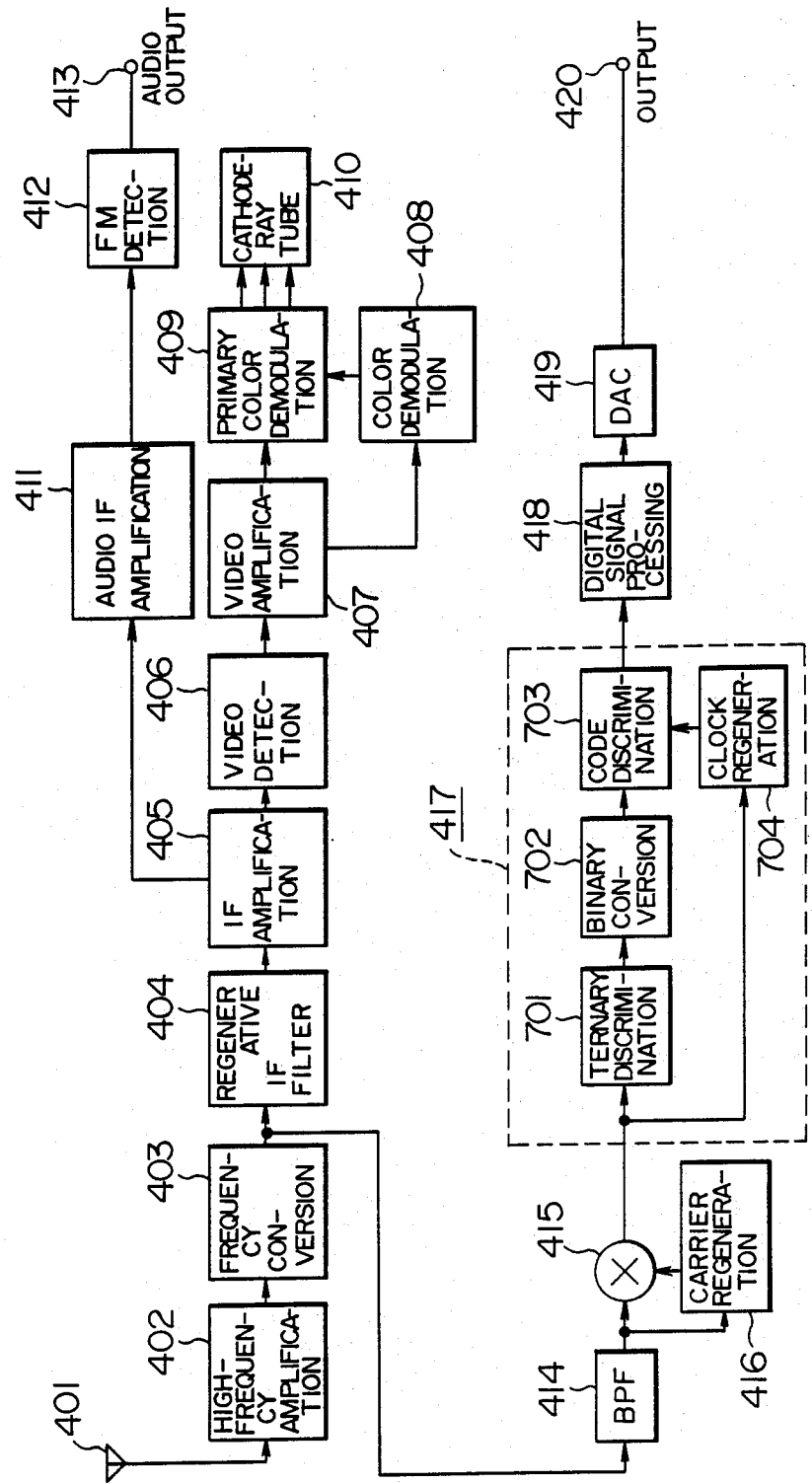
FIG. 7 is a block diagram of another example of a transmission signal regeneration apparatus according to the present invention.

FIG. 7 is a block diagram showing another embodiment of a television transmission signal regeneration apparatus according to the present invention. The same symbols as those of FIG. 4 represent identical functions. Numeral 417 denotes a spectrum suppression processing signal regeneration circuit, 701 a ternary discrimination circuit, 702 a ternary-binary conversion circuit, 703 a code discrimination circuit, and 704 a clock regeneration circuit. Since the transmitted signal is ternary as represented by the waveform 603 of FIG. 6, the ternary-binary conversion circuit is included in the regeneration apparatus. The waveform detected by the synchronous detection circuit 415 is converted into ternary digital data +1, 0 or −1 by the ternary discrimination circuit 701, and then converted into binary digital data by the ternary-binary conversion circuit 702. In the code discrimination circuit 703, the digital signal is strobed by a clock regenerated in the clock regeneration circuit 704.

Figure 8:
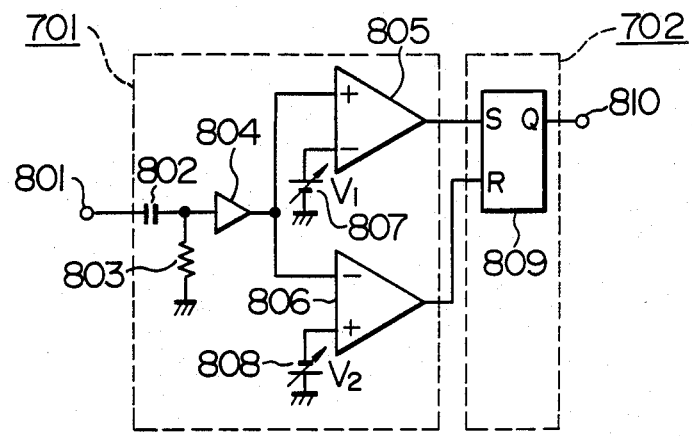
FIG. 8 is a block diagram of an example of a ternary discrimination circuit suitable for use in the apparatus of FIG. 7.
Figure 9:
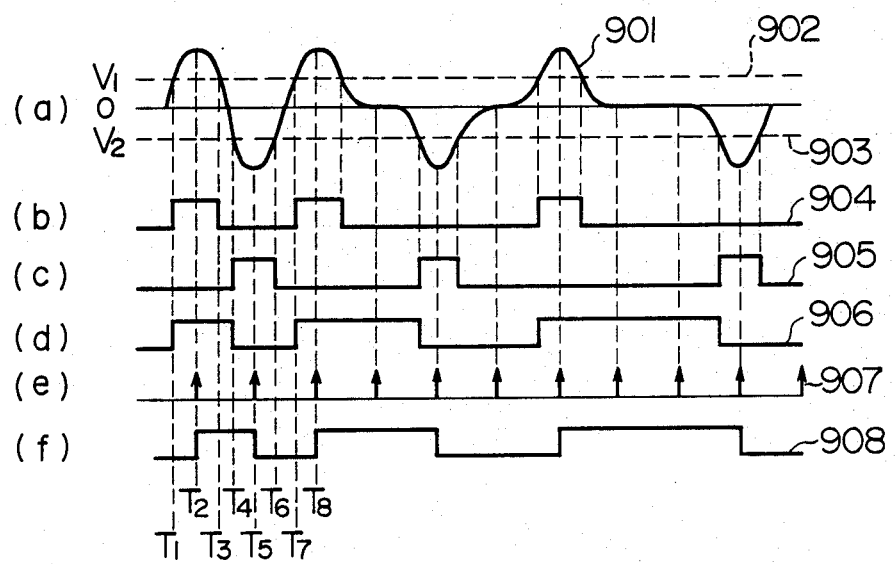
FIG. 9 shows an example of a waveform diagram used in explaining the operation of the apparatus of FIGS. 7 and 8.

FIG. 8 shows a concrete example of the circuit including the ternary discrimination circuit 701 of FIG. 7. FIG. 9 is a waveform diagram for explaining the operation of FIGS. 7 and 8. Numeral 701 denotes a ternary discrimination circuit, 702 a ternary-binary conversion circuit, 801 an input terminal, 802 a capacitor, 803 a resistor, 804 an amplifier, 805 and 806 voltage comparator circuits, 807 and 808 reference voltage sources, 809 a set/reset circuit, and numeral 810 denotes a binary digital data output terminal. Numeral 901 denotes a waveform, 902 and 903 voltage values of reference power sources, 904 an output waveform of the voltage comparator circuit 805, 905 an output waveform of the voltage comparator circuit 806, 906 an output waveform of the set/reset circuit 809, 907 a clock timing pulse obtained from the clock regeneration circuit 704, and numeral 908 denotes an output waveform of the code discrimination circuit 703. The output signal of the synchronous detection circuit 415 is supplied to the input terminal 801. The direct current voltage of the signal is interrupted by the capacitor 802 and the resistor 803 and amplified by the amplifier 804, resulting in a signal having the waveform 901. The voltage of the signal having the waveform 901 is compared with a reference voltage $V_1$ and a reference voltage $V_2$ in the voltage comparator circuit 805 and the voltage comparator circuit 806. A signal having the waveform 904 is obtained at the output of the voltage comparator circuit 805, and a signal having the waveform 905 is obtained at the output of the voltage comparator circuit 806. Those signals are supplied to the set/reset circuit 809. A signal having the waveform 906 is obtained at the output of the set/reset circuit 809. This signal is obtained at the output terminal 810 as the output signal of the ternary- - 15 binary conversion circuit 702. At time $T_1$, the waveform 901 exceeds the reference voltage $V_1$, changing the waveform 904 to "High". Since the set/reset circuit 809 is set, the waveform 906 changes to "High". At time $T_3$, the waveform 901 falls below the reference power source $V_1$, changing the waveform 904 to "Low". However, the waveforms 905 and 906 are not changed. When time $T_4$ has been reached, the waveform 901 falls below the threshold voltage $V_2$, changing the waveform 905 to "High". Since the set/reset circuit 809 is thus reset, the waveform 906 changes to "Low". At time $T_6$, the waveform 901 exceeds the reference voltage $V_2$, and the waveform 905 changes to "Low". Since the waveform 904 remains "Low", however, the waveform 906 remains "Low". At time $T_7$, the waveform 901 exceeds the reference voltage $V_1$, changing the waveform 904 to "High" and the waveform 906 to "High". By the operation heretofore described, binary digital data as represented by the waveform 906 can be demodulated. In the code discrimination circuit 703, binary digital data represented by the waveform 901 is strobed by a clock timing pulse 907 regenerated in the clock regeneration circuit 704, resulting in binary digital data having the waveform 908. At time such as $T_2$, $T_5$ and $T_8$ indicated by arrows of clock timing pulses 907, the waveform 906 is strobed to generate the waveform 908. At time of arrows when data is strobed, the waveform 901 is separated furthest away from the reference voltage $V_1$ and the reference voltage $V_2$, and the occurrence probability of an error due to noises and the like becomes the smallest.

As heretofore described, the transmission signal shown in FIGS. 5 and 6 can be regenerated in the present embodiment shown in FIGS. 7 to 9.

Figure 10:
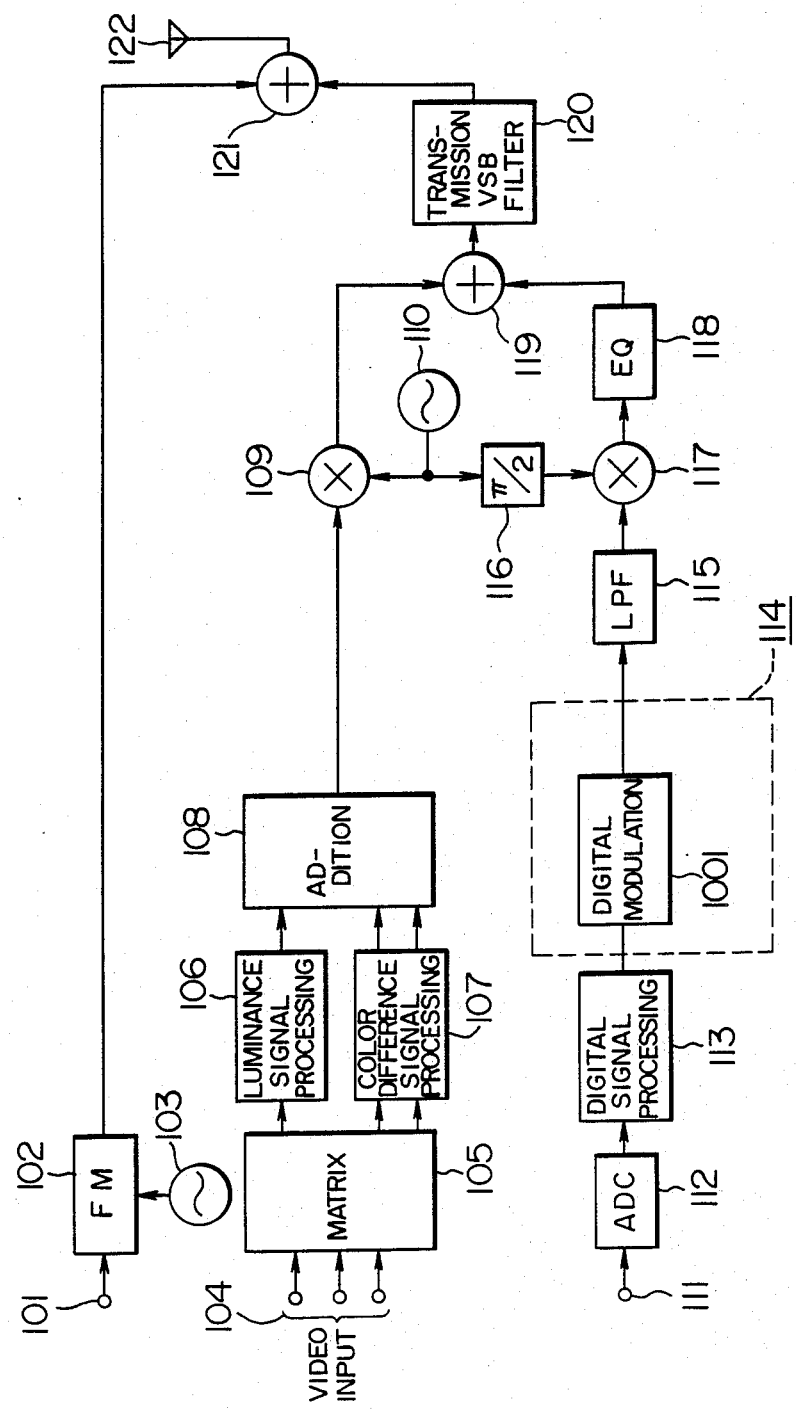
FIG. 10 is a block diagram of a further example of a transmission signal generation apparatus according to the present invention.

FIG. 10 shows another example of a block diagram illustrating an embodiment of a transmission signal generation apparatus of television signal transmission according to the present invention. The same symbols as those of FIG. 1 represent identical functions. Numeral 114 denotes a spectrum suppression processing circuit, and numeral 1001 denotes a digital modulation circuit. The output signal of the digital signal processing circuit 113 undergoes digital modulation, such as digital FM modulation, in the digital modulation circuit 1001, low-frequency components of the signal being suppressed. In the same way as FIG. 1, therefore, the present invention brings about an effect that the interference caused on the television can be reduced. The digital modulation system in which low-frequency components are suppressed, such as the digital FM modulation system, is described in detail in "Modulation system of digital magnetic recording", Nikkei Electronics, Dec. 11, 1978, pp. 126 to 164, for example.

Figure 11:
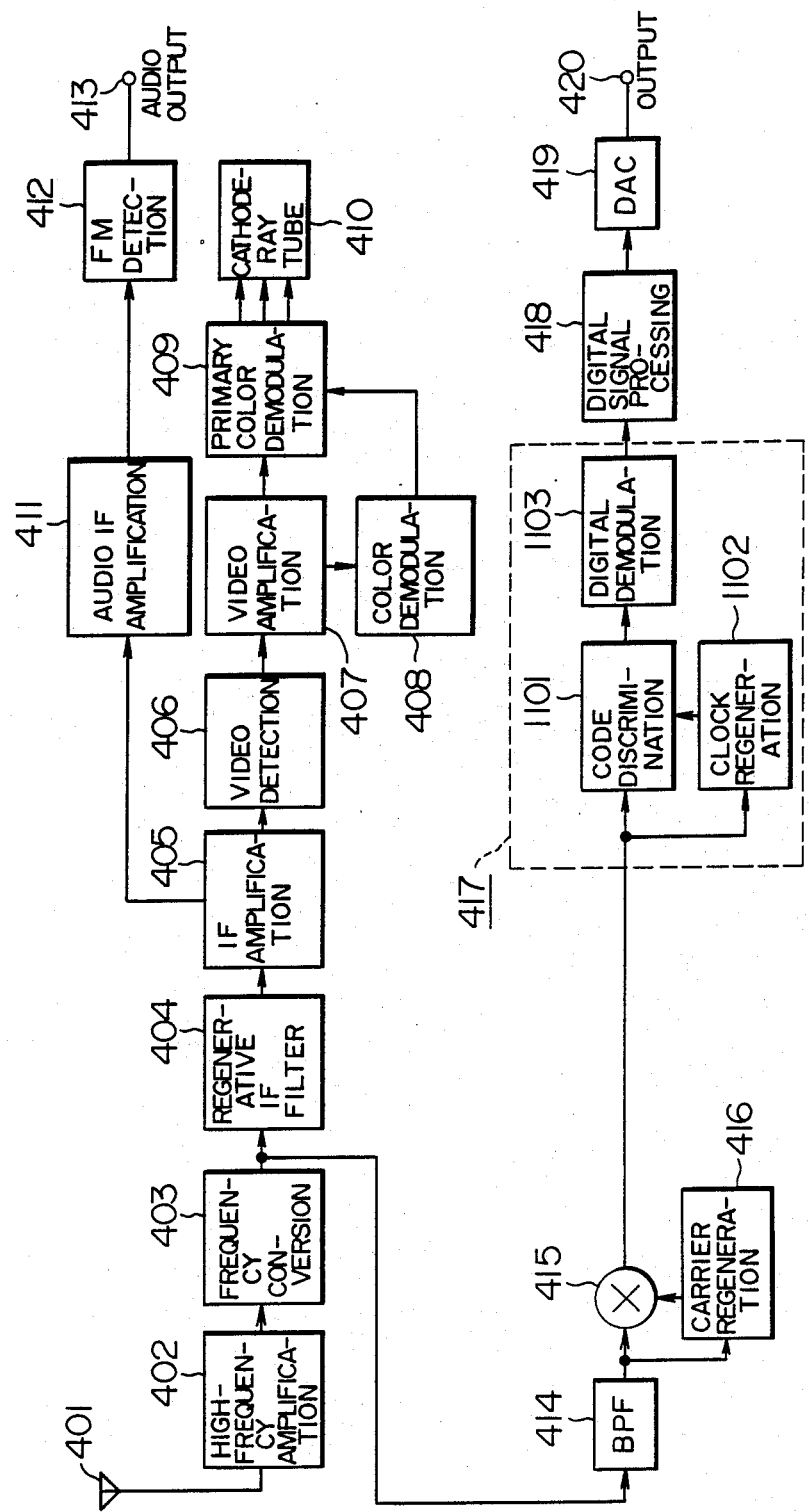
FIG. 11 is a block diagram of a further example of a transmission signal regeneration apparatus according to the present invention.

FIG. 11 shows another example of a block diagram for an embodiment of a transmission signal regeneration apparatus of television signal transmission according to the present invention. The same symbols as those of FIG. 4 represent identical functions. Numeral 417 denotes a spectrum suppression processing signal regeneration circuit, 1101 a code discrimination circuit, 1102 a clock regeneration circuit, and 1103 a digital demodulation circuit. In the code discrimination circuit 1101, the output signal of the synchronous detection circuit 415 is strobed by the clock signal regenerated in the clock regeneration circuit 1102 with such timing that the occurrence probability of errors caused by noise or the like may become low, resulting in a digital signal. In the digital demodulation circuit 1103, this digital signal is restored to digital data processed at the transmission side before digital modulation. By the operation of the spectrum suppression processing signal regeneration circuit 417, the signal which has undergone the spectrum suppression processing and has been transmitted can be regenerated.

The present embodiment brings about an effect that the transmission signal shown in FIG. 10 can be regenerated.

FIG. 12 is a block diagram of another concrete example of the spectrum suppression processing circuit 114 shown in FIG. 1. Numeral 114 denotes a spectrum suppression processing circuit, 1201 an input terminal, 1202 a time base compression circuit, 1203 a timing generation circuit, 1204 an inverter, 1205 a delay circuit, 1206 a changeover switch, and 1207 an output terminal.

In this concrete example of the spectrum suppression processing circuit, continuous data supplied to the input terminal 1201 is converted into intermittent data by the time base compression circuit 1202. By the inverter 1204, the delay circuit 1205 and the changeover switch 1206, inverted identical data are obtained between the intermittent data. As a result, data and its inverted data are transmitted at a certain fixed interval. Therefore, low-frequency components located near the direct current of the signal obtained on the average and components of that signal located near the frequency indicated by the reciprocal of the period of the fixed interval are suppressed.

Figure 13:
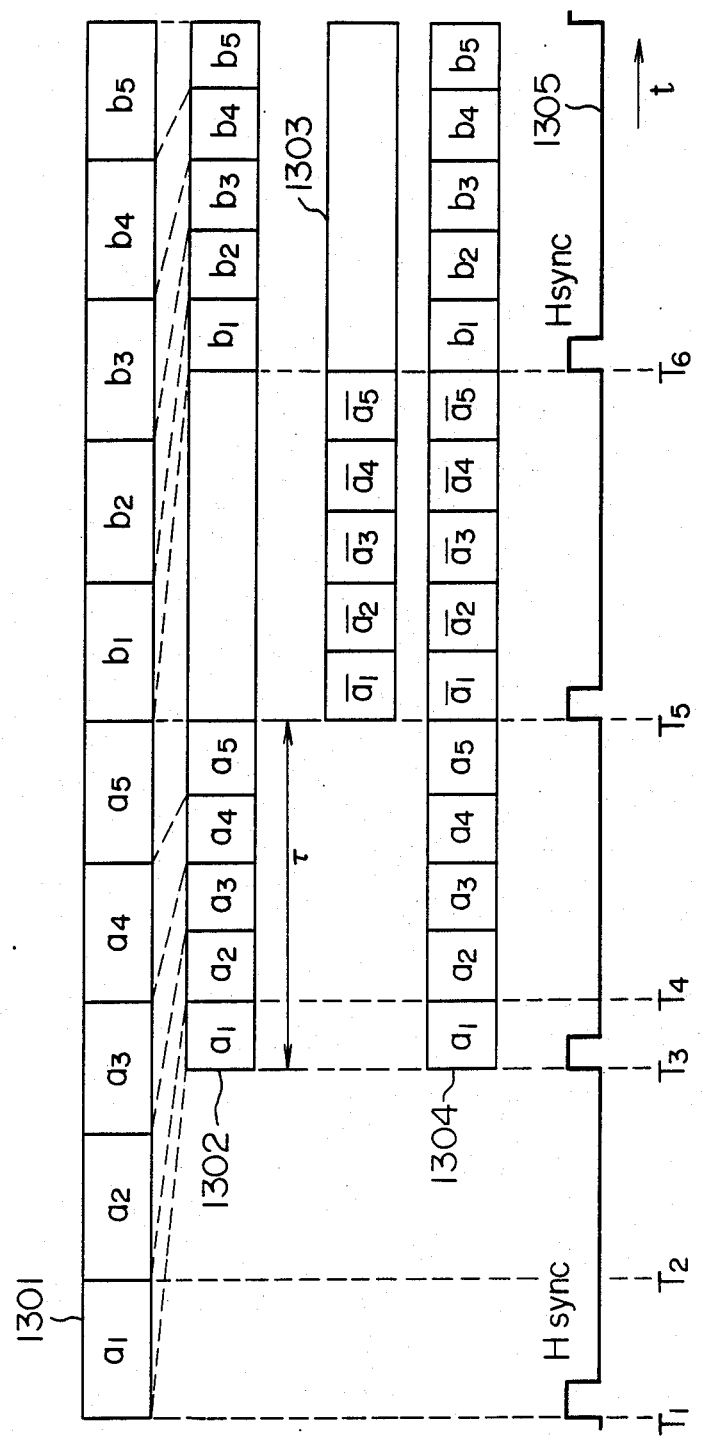
FIG. 13 shows an example of a data train for explaining the operation of the circuit of FIG. 12.

FIG. 13 shows an example of a transmission data train for explaining the operation of FIG. 12. Numeral 1301 denotes a data train obtained at the input terminal 1201, 1302 an output data train of the time base compression circuit, 1303 an output data train of the delay circuit 1205 which has been passed through the inverter 1204 and the delay circuit 1205, 1304 an output data train of the changeover switch 1206, and numeral 1305 denotes a timing waveform.

The data train 1301 supplied to the input terminal 1201 is compressed in time base by the time base compression circuit 1202 and the timing of the timing generation circuit 1203, resulting in the data train 1302. The duration of the data train 1301 lasting from time $T_1$ to time $T_5$ is compressed by half, resulting in duration of the data train 1302 lasting from time $T_3$ to time $T_5$. This intermittent data 1302 is inverted in the inverter 1204 and delayed by time $\tau$ in the delay circuit 1205, resulting in a data train 1303. In the changeover switch 1206, the data train 1302 and the data train 1303 are changed over alternately by the timing waveform 1305 at time $T_1$, $T_3$, $T_5$, $T_6$ and so on, resulting in the data train 1304. The data train 1302 and the data train 1303 have intermittent data. Signal presence periods of respective data trains do not coincide each other. Even if the data train 1302 and the data train 1303 are digitally added, therefore, data train 1304 can be obtained. In this case, therefore, the changeover switch 1206 may comprise a digital adder circuit (OR circuit).

FIG. 14 is a simulation diagram showing the transmission pattern. FIG. 14 shows the appearance of the multiplex-transmitted signal on a television screen obtained when the timing waveform 1305 of FIG. 13 is in synchronism with the horizontal synchronization signal of the television signal.

Data $a_1$ to $a_5$, data $\bar{a}_1$ to $\bar{a}_5$, data $b_1$ to $b_5$, and data $\bar{b}_1$ to $\bar{b}_5$ are transmitted during the first, second, third and fourth horizontal scanning periods, respectively. As a result, two adjacent horizontal scanning periods such as the first and the second horizontal scanning periods or the third and the fourth horizontal scanning periods have data which are opposite each other in phase.

Since the above described multiplex signal is inverted every other horizontal scanning period, the direct current component in the spectrum of the multiplex signal is suppressed. In addition, the frequency component corresponding to one horizontal scanning period (horizontal scanning frequency component) and its higher harmonic components are suppressed.

Figure 15A:
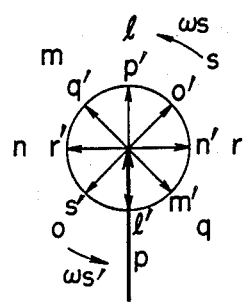
FIG. 15 shows a vector diagram of a video color subcarrier used for explaining the present invention.
Figure 15B:
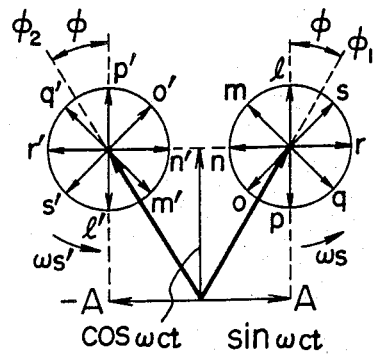

Here, we consider the video color subcarrier of the current television. FIG. 15 is a vector diagram showing a change in the video carrier caused by the color subcarrier. FIG. 15(a) is a vector diagram of the video carrier obtained when the quadrature component is not multiplexed. FIG. 15(b) is a vector diagram of the video carrier obtained when the quadrature component is multiplexed. The angular frequency $\omega_s$ of the color subcarrier changes to vary the phase from l to s via m, n, o and so on. The angular frequency $\omega_s'$ of the color subcarrier of the adjacent horizontal scanning period is displaced in phase from $\omega_s$ by $\pi$ and changes while varying the phase from l' to s' via m', n' and so on. A and $-A$ represent multiplex onto the quadrature components. On the basis of the relationship between the color subcarrier frequency and the horizontal scanning frequency of the current television, phases of the color subcarrier of adjacent horizontal scanning periods differ from each other by $\tau$. In the vector diagram of FIG. 15(b), signal A is multiplexed in a quadrature multiplex system during a horizontal scanning period having a subcarrier with phase $\omega_s$, and signal $-A$ is multiplexed during the adjacent horizontal scanning period of $\omega_s'$. As shown in FIG. 14 as well, the quadrature multiplex component causes a phase change of the video carrier. If the detection system of the television video signal is an envelope detection system or a pseudo-synchronous detection system, a signal corresponding to the envelope of the video carrier is obtained as the output signal of the video detection. The phase of the color subcarrier contained in the video detection output signal is l or p' in the case of FIG. 15(a) where quadrature multiplexing is absent and is $\phi_1$ or $\phi_2$ in the case of FIG. 15(b) where quadrature multiplexing is present. These phase differences are $\phi$. A change in phase of the color subcarrier causes a change in hue on the regenerated video screen. If the video detection system is the synchronous detection system, only the component in the illustrated direction of $\cos \omega_c t$ is detected. Even if multiplexing of A is present, therefore, the phase of the maximum amplitude is l or p', and a phase change is not caused. If multiplex signals are inverted from each other in phase, as represented by A, and $-A$ on the basis of the multiplexed sign, phase directions of the color subcarrier are opposite each other in the case of envelope detection and the like. If signals multiplexed during adjacent horizontal scanning periods are inverted from each other in phase as represented by A and $-A$, color subcarriers have the relation of $\omega_s$ and $\omega_s'$ shown in FIG. 15(b). Color subcarriers are equal in phase change and opposite each other in phase. In adjacent horizontal scanning periods, therefore, the upper and lower hue changes on the television screen become opposite each other in phase. A person watching such a screen is hardly conscious of the hue change because of low frequency characteristics of visual chromaticity sensitivity and the integration effect of eyes. That is to say, a person is hardly conscious of the hue change between the horizontal scanning period lasting from $a_1$ to $a_5$ shown in FIG. 14 and the horizontal scanning period lasting from $\bar{a}_1$ to $\bar{a}_5$ or between the horizontal scanning period lasting from $b_1$ to $b_5$ and the horizontal scanning period lasting from $\bar{b}_1$ to $\bar{b}_5$. In a portion where the relation of the same data and opposite phase is not satisfied, such as a portion comprising the horizontal scanning period lasting from $\bar{a}_1$ to $\bar{a}_5$ and the horizontal scanning period lasting from $b_1$ to $b_5$, an effect of making the hue change hardly detectable is absent.

Figure 16:
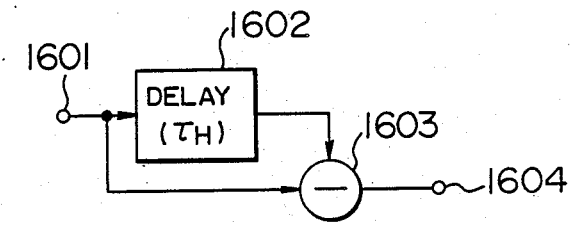
FIG. 16 is a block diagram of an example of a general configuration of a comb filter.
Figure 17:
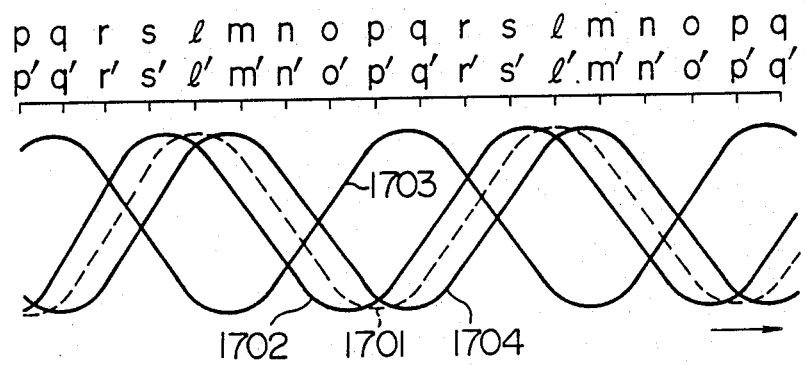
FIG. 17 shows a waveform diagram used in explaining the operation of the present invention.

If identical data with opposite phases are transmitted in adjacent horizontal scanning periods and a "comb filter" using correlation between horizontal scanning periods (so-called line correlation) is used in the television receiver to separate the luminance signal and the color difference signal, the phase change of the color subcarrier is canceled in the circuit, the hue change being prevented. FIG. 16 is a configuration diagram of a typical comb filter for separating the luminance signal and the color difference signal and for taking out the color difference signal. Numeral 1601 denotes an input terminal, 1602 a delay circuit, 1603 a subtraction circuit, and 1604 an output terminal. The color difference signal supplied to the input terminal 1601 and the color difference signal delayed by one horizontal scanning period in the delay circuit 1602 undergo subtraction operation in the subtraction circuit 1603. The resultant signal is obtained at the output terminal 1604. FIG. 17 is a waveform diagram for explaining the operation. Numeral 1701 denotes a waveform obtained in case multiplexing is not performed. Numeral 1702 denotes a waveform obtained in case of the right side of FIG. 15 where the color subcarrier of $\omega_s$ undergoes multiplexing of A. Numeral 1703 denotes a waveform obtained in case of the left side of FIG. 15(b); where the color subcarrier of $\omega_s$ undergoes multiplexing of −A. Numeral 1704 denotes a waveform obtained by inverting the waveform 1703. The amplitude of the color subcarrier waveform 1701 obtained when multiplexing is absent is maximized at time l. The color subcarrier waveform 1702, obtained when the multiplex signal A is quadrature-multiplexed, undergoes phase change of $\phi_1$ and assumes the maximum amplitude between time s and time l. The color subcarrier waveform 1703, obtained when the multiplex signal −A is quadrature-multiplexed during the adjacent horizontal scanning period, undergoes phase change of $\phi_2$ and assumes the maximum amplitude between time p′ and time q′. Subtraction of the waveform 1703 from the waveform 1702 delayed by one horizontal scanning period in the delay circuit 1602 performed in the subtraction circuit 1603 is equivalent to addition of the waveform 1704 obtained by inverting the waveform 1703 to the waveform 1702. If the amplitude of the waveform obtained by the addition is halved, the same waveform as the waveform 1701 is obtained. That is to say, the color subcarrier obtained by this comb filter is not subject to phase change caused by the quadrature multiplexed signal even if the video signal detection circuit is an envelope detection circuit. In this case as well, a phase change is not caused only when upper and lower data of adjacent horizontal scanning periods are the same excepting the opposition in phase as represented by the horizontal scanning period lasting from $a_1$ to $a_5$ and the horizontal scanning period lasting from $\bar{a}_1$ to $\bar{a}_5$ shown in FIG. 14. In case of FIG. 14, phase change is absent every other horizontal scanning period.

As evident from the foregoing description, the present embodiment in which the spectrum suppression processing circuit 114 of FIG. 1 comprises the circuit of FIG. 12 also brings about an effect that the interference on the hue change of the video signal caused by the multiplex-transmitted signal can be reduced.

Assuming that the transmission data is continuous data, the time base compression circuit 1202 is used in FIG. 12. In case the transmission data is intermittent discontinuous data, however, the time base compression circuit is not required.

Figure 18:
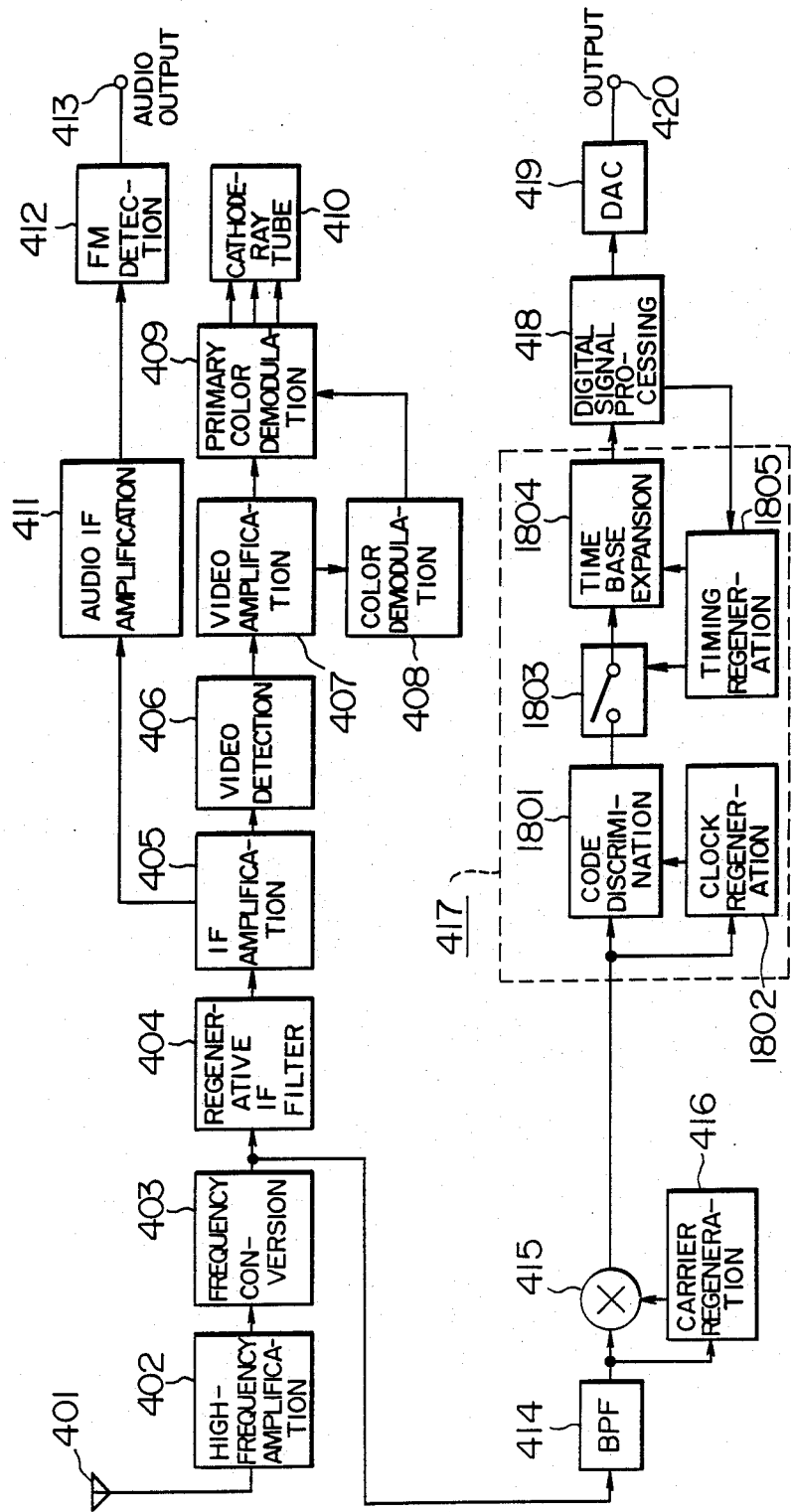
FIG. 18 is a block diagram of a further example of a transmission signal regeneration apparatus according to the present invention

FIG. 18 is a block diagram showing another embodiment of a television transmission signal regeneration apparatus according to the present invention. The same symbols as those of FIG. 4 represent identical functions. Numeral 417 denotes a spectrum suppression processing signal regeneration circuit, 1801 a code discrimination circuit, 1802 a clock regeneration circuit, 1803 a changeover circuit, 1804 a time base expansion circuit, and 1805 a timing regeneration circuit. By a clock timing pulse regenerated in the clock regeneration circuit 1802, the waveform detected in the synchronous detection circuit 415 is converted into a digital code by the code discrimination circuit 1801. Data of a necessary period within the signal restored to the digital code is selected to be taken out by the changeover circuit 1803 and the timing regeneration circuit 1804. Thereafter, the data thus taken out is restored to the original transmission data.

Figure 19:
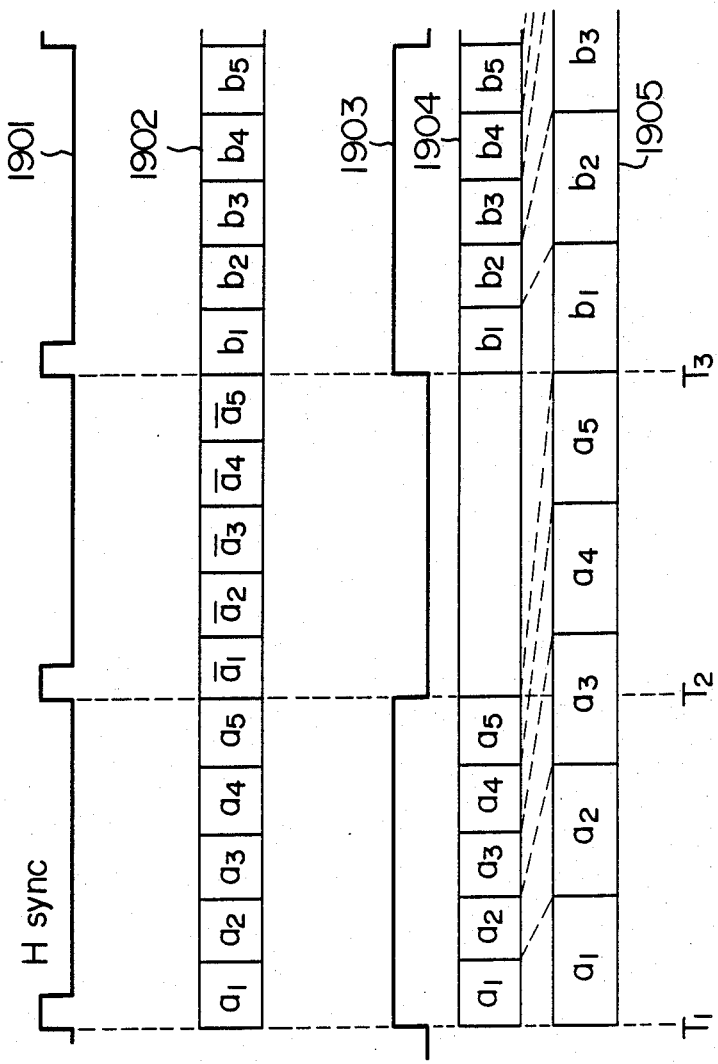
FIG. 19 shows an example of a data train used in explaining the operation of the apparatus of FIG. 18.

FIG. 19 shows an example of data train for explaining the operation of FIG. 18. Numeral 1901 denotes a timing waveform for synchronizing the horizontal scanning period, 1902 a data train of the transmitted and received signal as shown in FIGS. 12, 13 and 14, 1903 a timing waveform obtained from the timing waveform 1901, 1904 an output data train of the changeover circuit 1803, and 1905 an output data train of the time base expansion circuit 1804. On the basis of the timing waveform 1903 obtained from the timing waveform 1901 of the horizontal synchronizing signal, the changeover circuit 1803 is closed from time $T_1$ to time $T_2$ and opened from the time $T_2$ to time $T_3$. Thereafter, the changeover circuit 1803 is repetitively closed and opened. As a result, the transmitted and received data train 1902 which is the output of the code discrimination circuit 1801 is converted into the data train 1904. By the time base expansion circuit 1804, the intermittent data lasting from the time $T_1$ to the time $T_2$ of the data train 1904 is expanded to generate intermittent data lasting from the time $T_1$ to the time $T_3$. This operation is repeated to produce the data train. As a result, the data train before the spectrum suppression processing as represented by the data train 1301 of FIG. 13 is regenerated.

As heretofore described, the present embodiment brings about an effect that the transmission signal as shown in FIGS. 12, 13 and 14 can be regenerated.

Figure 20:
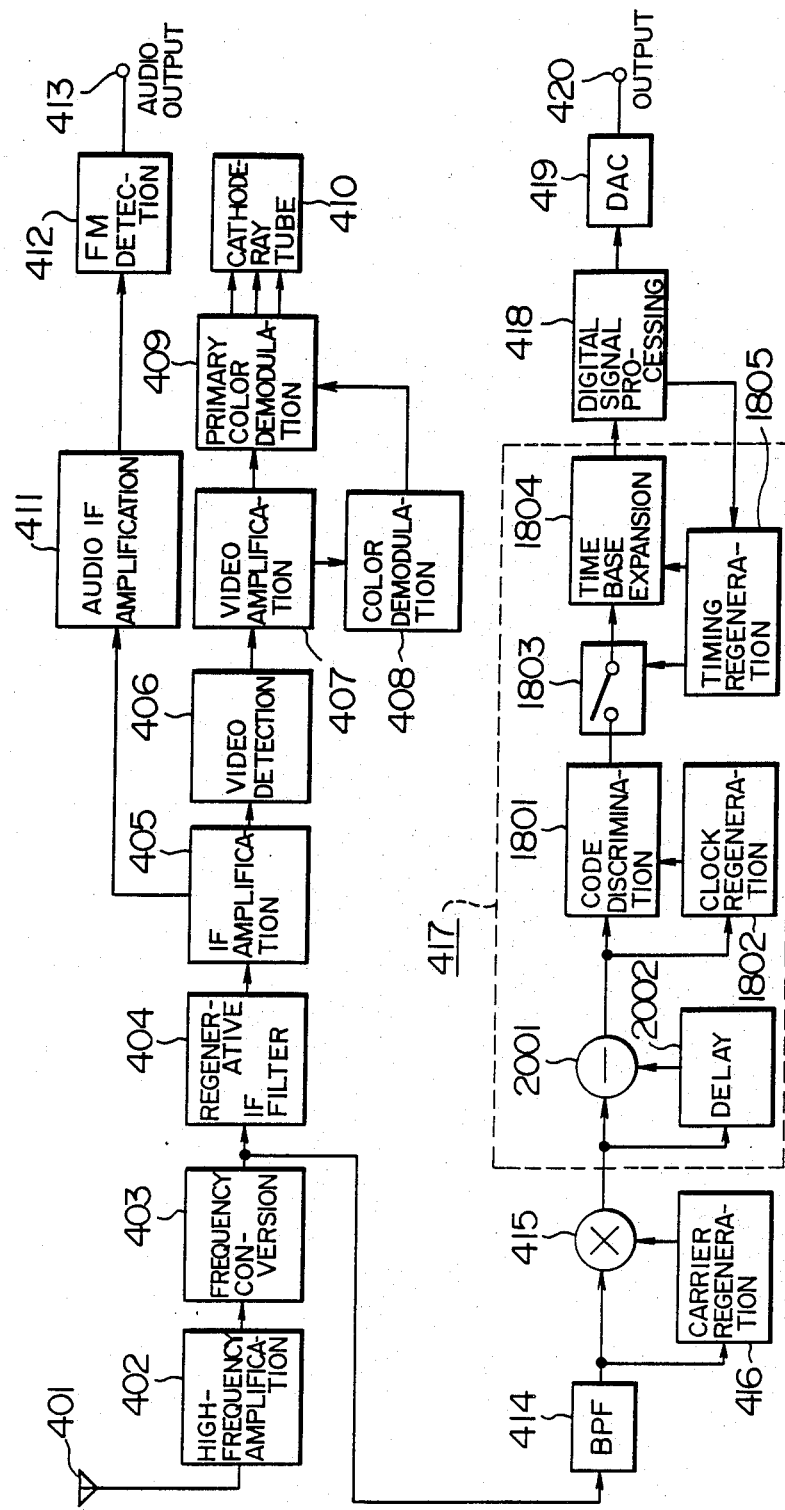
FIG. 20 is a block diagram of a further example of a transmission signal regeneration apparatus according to the present invention.

FIG. 20 is a block diagram of a further embodiment of a television transmission signal regeneration apparatus according to the present invention. The same symbols as those FIGS. 4 and 18 represent identical functions. Numeral 417 denotes a spectrum suppression processing signal reproduction circuit. Numerals 2001 and 2002 denote a subtraction circuit and a delay circuit, respectively. As shown in FIGS. 12, 13 and 14, identical data with opposite phases are multiplex-transmitted during two horizontal scanning periods. By applying subtraction in the subtraction circuit 2001 to the output signal of the synchronous detection circuit 415 and the signal delayed by one horizontal scanning period in the delay circuit 2002, therefore, the data amplitude is doubled. White noises added in the transmission system is increased to only $\sqrt{2}$ times. The interference signal from the video signal caused by ghosts or the like of the video signal are canceled and removed because the video signal has correlation between adjacent horizontal scanning periods. Removal of the interference signal from the video signal is performed by the following process. It is now assumed that data X is transmitted at a certain time of a certain horizontal scanning period, and data $\overline{X}$ obtained by inverting data X is transmitted when one horizontal scanning period has elapsed. The received signal $\overline{X}$ and data X delayed by one horizontal scanning period in the delay circuit 2002 are supplied to the subtraction circuit 2001 at the same timing to undergo subtraction. Accordingly, the output of the subtraction circuit becomes $$X - (\overline{X}) = 2X. \tag{6}$$

A doubled signal is thus obtained. Succeedingly, it is now assumed that interference G from the video signal is applied during the transmission. The video signal has strong correlation between horizontal scanning periods. (The correlation is especially strong in images such as vertical stripes.) As a result, the interference caused by the video signal is G both at timing of the data X and timing of the data $\overline{X}$. The output of the subtraction circuit 2001 becomes $$(X+G)-(\overline{X}+G)=2X. \quad (7)$$

The interference G is thus canceled. In a portion where correlation between horizontal scanning periods of the video signal is weak, the cancellation effect is not significant.

Figure 21:
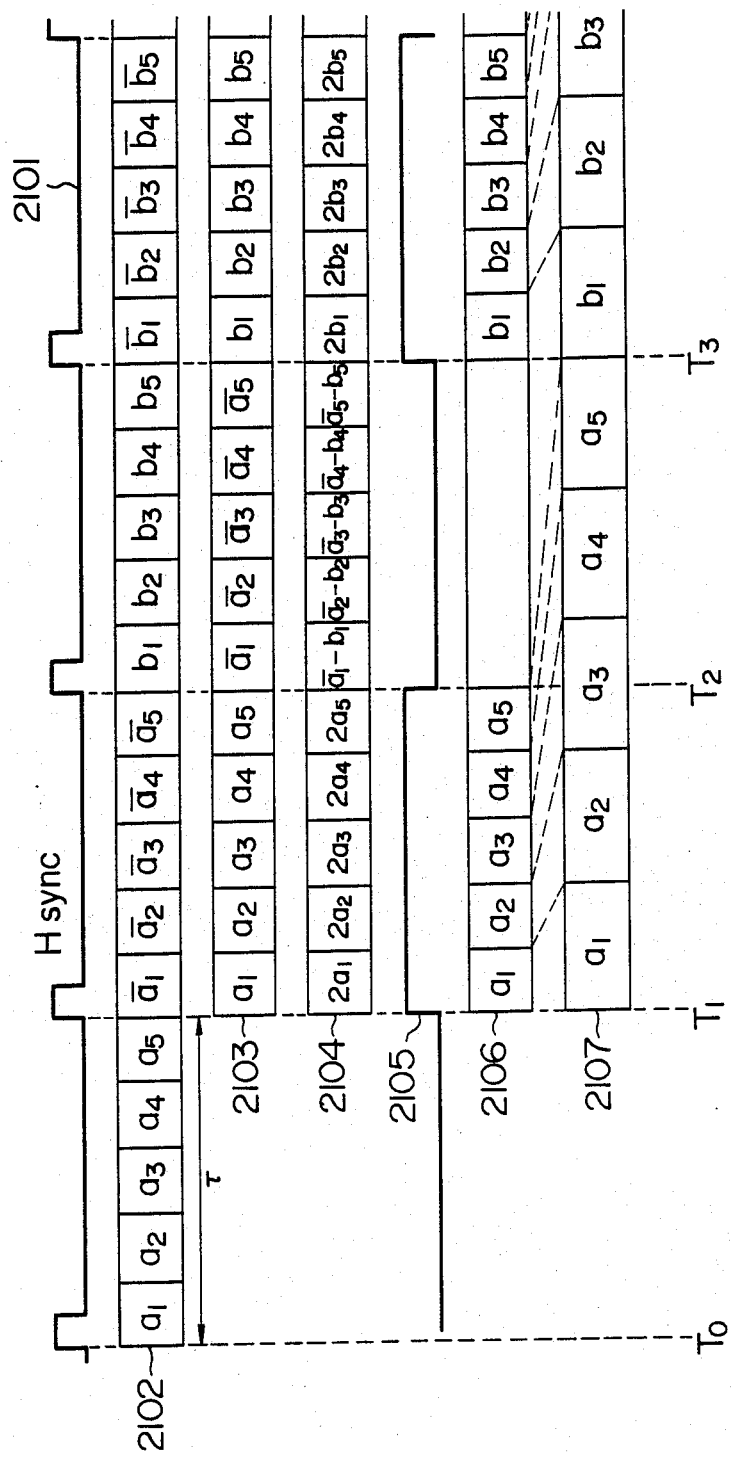
FIG. 21 shows an example of a data train used for explaining the operation of the apparatus of FIG. 20.

FIG. 21 shows an example of a data train for the purpose of explaining the operation of FIG. 20. Numeral 2101 denotes a timing waveform for synchronizing the horizontal scanning period, 2102 a data train obtained after the transmission signal shown in FIGS. 12, 13 and 14 has been received, 2103 an output data train of the delay circuit 2002, 2104 an output data train of the subtraction circuit 2001, 2105 a timing waveform obtained from the timing waveform 2101, 2106 an output data train of the changeover circuit 1803, and 2107 an output data train of the time base expansion circuit 1804. The transmitted and received data train 2102, which is the output of the synchronous detection circuit 415, is delayed by one horizontal scanning period in the delay circuit 2002, resulting in a data train 2103. Data at time $T_0$ is delayed to time $T_1$. The data train 2102 is subtracted from the delayed data train 2103 in the subtraction circuit 2001, resulting in a data train 2104. On the basis of the timing waveform 2105 obtained from the timing waveform 2101 of the horizontal synchronizing signal, the changeover switch 1803 is closed from time $T_1$ to time $T_2$ and is opened from time $T_2$ to time $T_3$. Thereafter, the changeover switch 1803 is repetitively opened and closed in the same way. As a result, the data train 2106 is obtained from the data train 2104. In the description of the data of the data train and 2106, the coefficient 2 is omitted. For example, $2a_1$ is represented by $a_1$. By the time base expansion circuit 1804, data lasting from the time $T_1$ to the time $T_2$ of the data train 2106 is expanded, resulting in data lasting from the time $T_1$ to the time $T_3$. Repetition of this operation produces the data 2107. As a result, the data train before the spectrum suppression processing as represented by the data train 1301 of FIG. 13 is regenerated.

Figure 22:
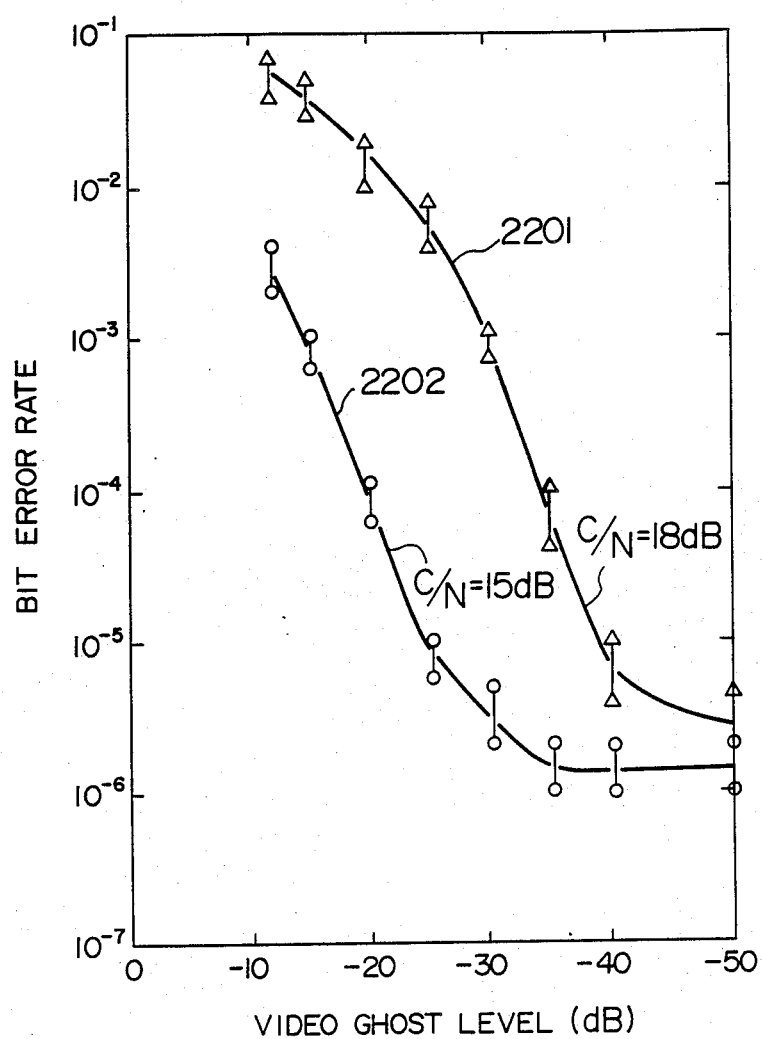
FIG. 22 shows a graph useful in illustrating the effect of the apparatus of FIG. 20.

The present embodiment brings about an effect that the transmission signal shown in FIGS. 12, 13 and 14 can be regenerated and an effect that the interference from the video signal can also be reduced. FIG. 22 is a graph for illustrating the last effect. The abscissa indicates the interference level caused by the ghost and the like. (As the abscissa proceeds to the right, the interference level is reduced.) The ordinate indicates the bit error rate representing the error rate caused by the transmission. In the experiment, white noise is added to the transmission path to cause errors. In that case, the ratio of the carrier of the quadrature-multiplexed signal to the noise is indicated by C/N. Numeral 2201 denotes a curve of measurements obtained when the subtraction circuit 2001 is not used. Numeral 2202 denotes a curve of measurements obtained when the subtraction circuit 2001 is used. For the curve 2202, the ghost level corresponding to a bit error rate $10^{-4}$ is located to the left by approximately 15 dB as compared with the curve 2201. The fact that an identical error rate is obtained when the ghost level is higher by approximately 15 dB means that the interference from the video signal caused by the ghost or the like can be advantageously reduced. When the ghost level is as low as $-50$ dB, the bit error rate of the curve 2202 with $C/N=15$ $dB$ is close to that of the curve 2201 with $C/N=18$ $dB$. This means that the subtraction circuit increases the signal amplitude by twice and the noise by $\sqrt{2}$ times, resulting in improvement of 3 dB in C/N.

Figure 23:
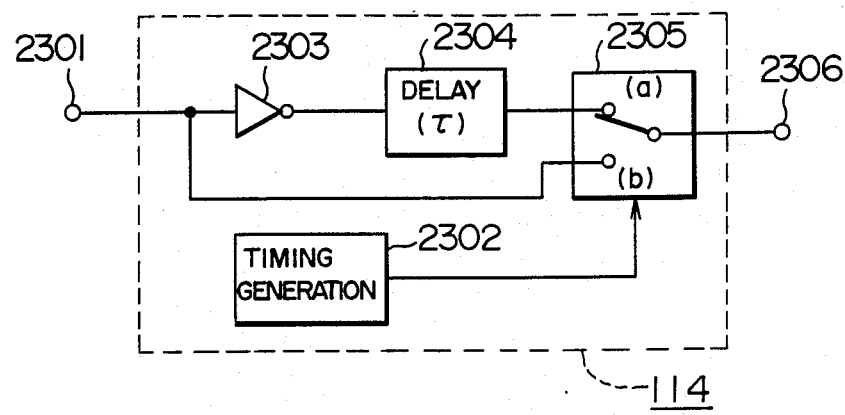
FIG. 23 is a block diagram of another example of the spectrum suppression processing circuit of a transmission signal generation apparatus according to the present invention.

FIG. 23 is a block diagram showing a further example of the spectrum suppression processing circuit 114 of FIG. 1. Numeral 114 denotes a spectrum suppression processing circuit, 2301 an input terminal, 2302 a timing generation circuit, 2303 an inverter, 2304 a delay circuit, 2305 a changeover switch, and 2306 an output terminal.

In a concrete example of the spectrum suppression processing circuit, data supplied to the input terminal 2301 is inverted in the inverter 2303 and delayed in the delay circuit 2304. On the basis of the signal generated by the timing generation circuit 2302, the inputted data and the inverted and delayed data are switched to appear at the output terminal 2306 by the changeover switch 2305.

Figure 24:
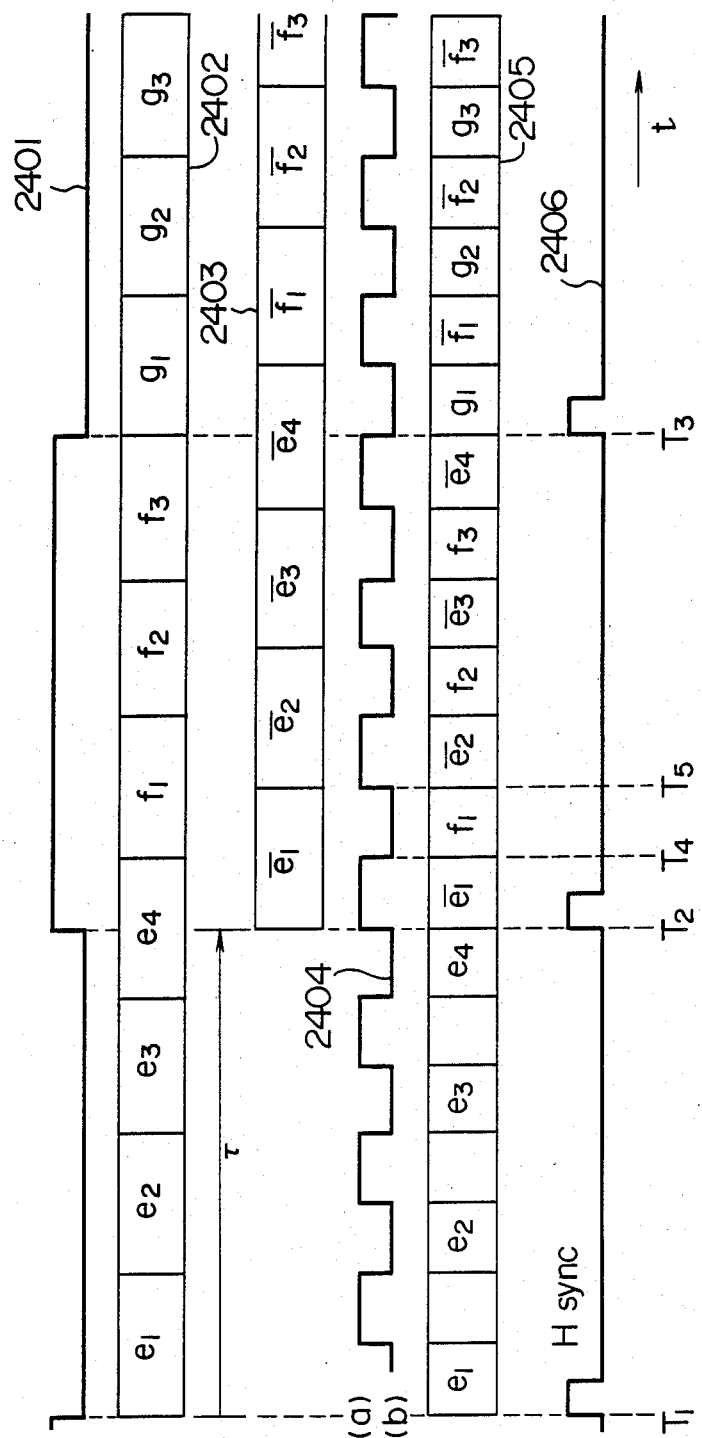
FIG. 24 shows an example of a data train used in explaining the operation of the circuit of FIG. 23.

FIG. 24 shows an example of a transmission data train for the purpose of explaining the operation of FIG. 23. Numerals 2401, 2404 and 2406 denote timing waveforms, 2402 an input data train supplied to the input terminal 2301, 2403 an output data train of the delay circuit 2304, and numeral 2405 denotes an output data train.

The data train 2402 supplied to the input terminal 2301 is inverted in the inverter 2303 and delayed by $\tau$ in the delay circuit 2304, resulting in a data train 2403. The timing waveform 2401 changes at the interval $\tau$ (time $T_1$, $T_2$, $T_3$ and so on). The timing waveform 2404 changes midway data of the data train. Under a state (a) indicated by the illustrated high level, (i.e., during a period lasting from time $T_2$ to time $T_4$, for example), the changeover switch 2305 is connected to position (a). Under a switch (b) indicated by the illustrated low level, (i.e., during a period lasting from time $T_4$ to $T_5$, for example), the changeover switch 2305 is connected to position (b). The output data train 2405 of the changeover switch 2305 is obtained at the output terminal 2306.

Figure 25:
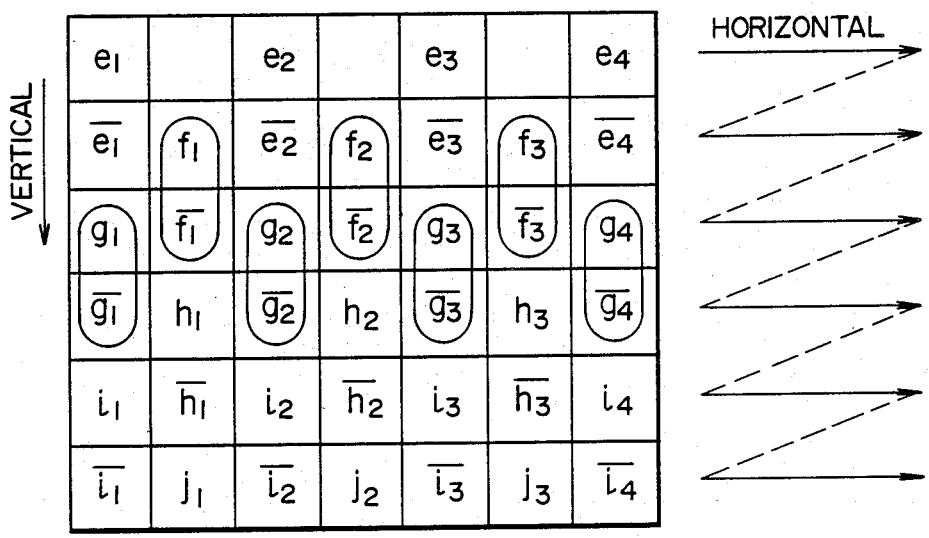
FIG. 25 schematically shows a diagram of an example of a transmission data pattern according to the present invention as illustrated in FIGS. 23 and 24.

FIG. 25 is a simulation diagram for illustrating the transmission pattern. FIG. 25 shows the appearance of the multiplex-transmitted signal on the television screen under the condition that the timing waveform 2406 of FIG. 24 is in synchronism with the horizontal synchronizing signal of the television signal. The horizontal scanning direction is indicated in the breadthwise direction, and the vertical scanning direction is indicated in the lengthwise direction. As indicated by rounded frames in FIG. 25, upper data of adjacent horizontal scanning periods becomes inverted data of the lower data every other data. Since data of adjacent horizontal scanning periods are inverted with respect to each other, multiplex signals for the quadrature components of the video carrier have opposite phases. As a result, the interference on the hue change of the video signal caused by the multiplex-transmitted signal is advantageously reduced.

In the present embodiment heretofore described in which the spectrum suppression processing circuit 114 of FIG. 1 comprises the circuit shown in FIG. 23, multiplex-transmitted signals have opposite phases in adjacent horizontal scanning periods, resulting in an effect of reduced interference on the hue change of the video signal. Further, in all horizontal scanning periods, upper and lower data of adjacent scanning periods have opposite phases every other data period in a mesh form as indicated by rounded frames of FIG. 25. Accordingly, the interference on the hue change of the image becomes fine. Because of low sensitivity frequency of visual chromaticity, therefore, the interference is advantageously reduced.

Figure 26:
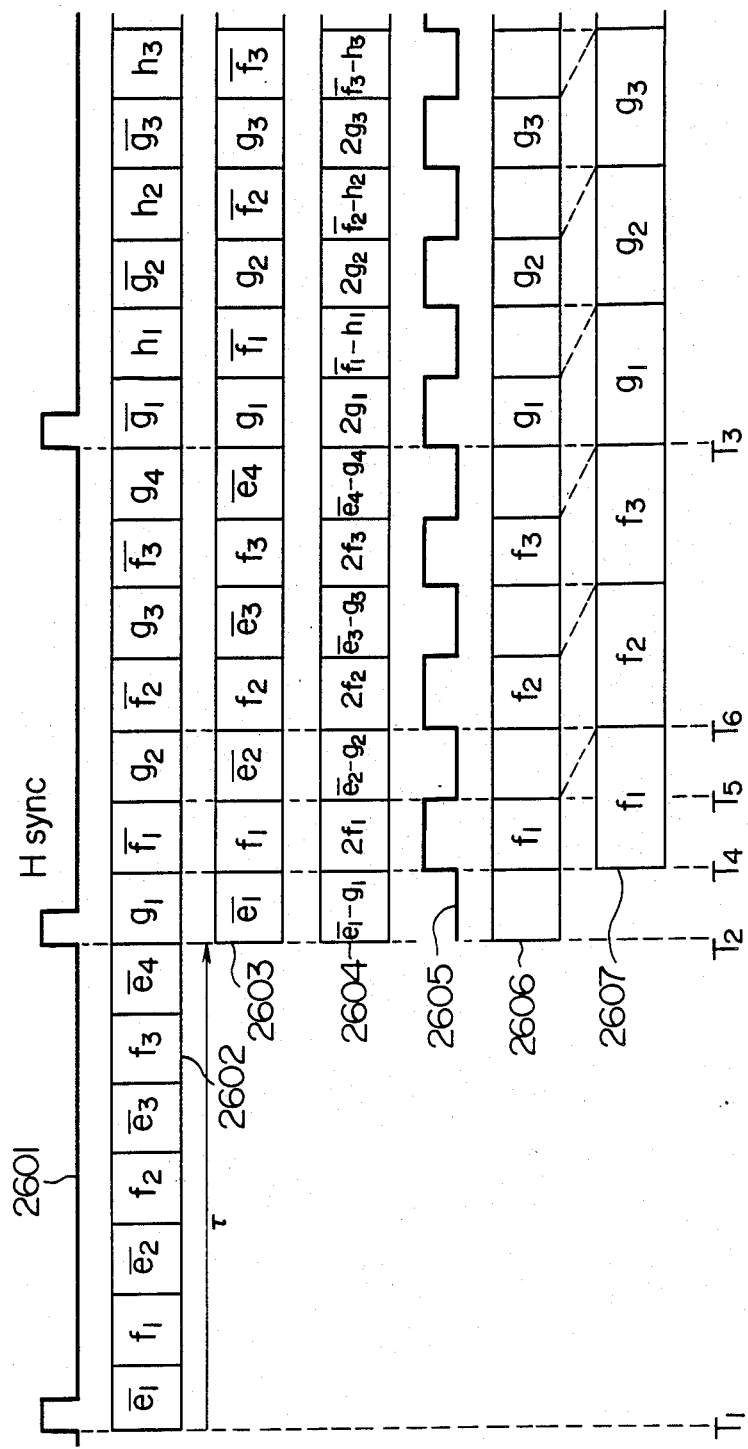
FIG. 26 shows an example of a data train used in explaining the operation of the present invention.

The above described transmission signal can be regenerated by the configuration shown in FIG. 20. Because of the partial difference of the operation timing, the data train is shown in FIG. 26 for the purpose of explaining the operation. Numeral 2601 denotes a timing waveform for synchronizing the horizontal scanning period, 2602 a data train obtained after the transmission signal shown in FIGS. 23, 24 and 25 has been received, 2603 an output data train of the delay circuit 2002, 2604 an output data train of the subtraction circuit 2001, 2605 a timing waveform, 2606 an output data train of the changeover switch 1803, and 2607 an output data train of the time base expansion circuit 1804. The transmitted and received data train 2602, which is the output of the synchronous detection circuit 415, is delayed by one horizontal scanning period in the delay circuit 2002, resulting in a data train 2603. Data at time $T_1$ is delayed to time $T_2$, and data at time $T_2$ is delayed to time $T_3$. In the subtraction circuit 2001, the data train 2602 is subtracted from the delayed data train 2603, resulting in a data train 2604. On the basis of the timing waveform 2605, the changeover switch 1803 is opened from time $T_2$ to time $T_4$, and closed from time $T_4$ to time $T_5$. Thereafter, the changeover switch 1803 is repetitively opened and closed. As a result, the train 2604 is converted into the data train 2606. In the description of data in data train 2606, coefficient 2 is omitted. For example, $2f_1$ is represented by $f_1$. The data train 2606 is expanded in time base to the data train 2607 by the time base expansion circuit 1804 so that data lasting from time $T_4$ to time $T_5$ may be expanded to data lasting from time $T_4$ to time $T_6$. As a result, the data train before the spectrum suppression processing, as represented by the data train 2402 of FIG. 24, is regenerated.

In the above described FIGS. 14 and 25, the multiplex-transmitted signals on the television screen are schematically shown. In the explanation of these cases, the multiplex-transmitted signal has a fixed number of data during a horizontal scanning period and is a synchronized signal. Even if the signal is not completely synchronized, however, a similar effect is obtained provided that the number of data in the horizontal scanning period is approximately constant. Even if the transmission speed of the multiplex-transmitted signal does not coincide the horizontal scanning period of television, as in case the length of the last data period of the horizontal scanning period is arbitrary or in case the number of data during a certain pair of horizontal scanning periods is increased or decreased, the signal can be transmitted.

Figure 27:
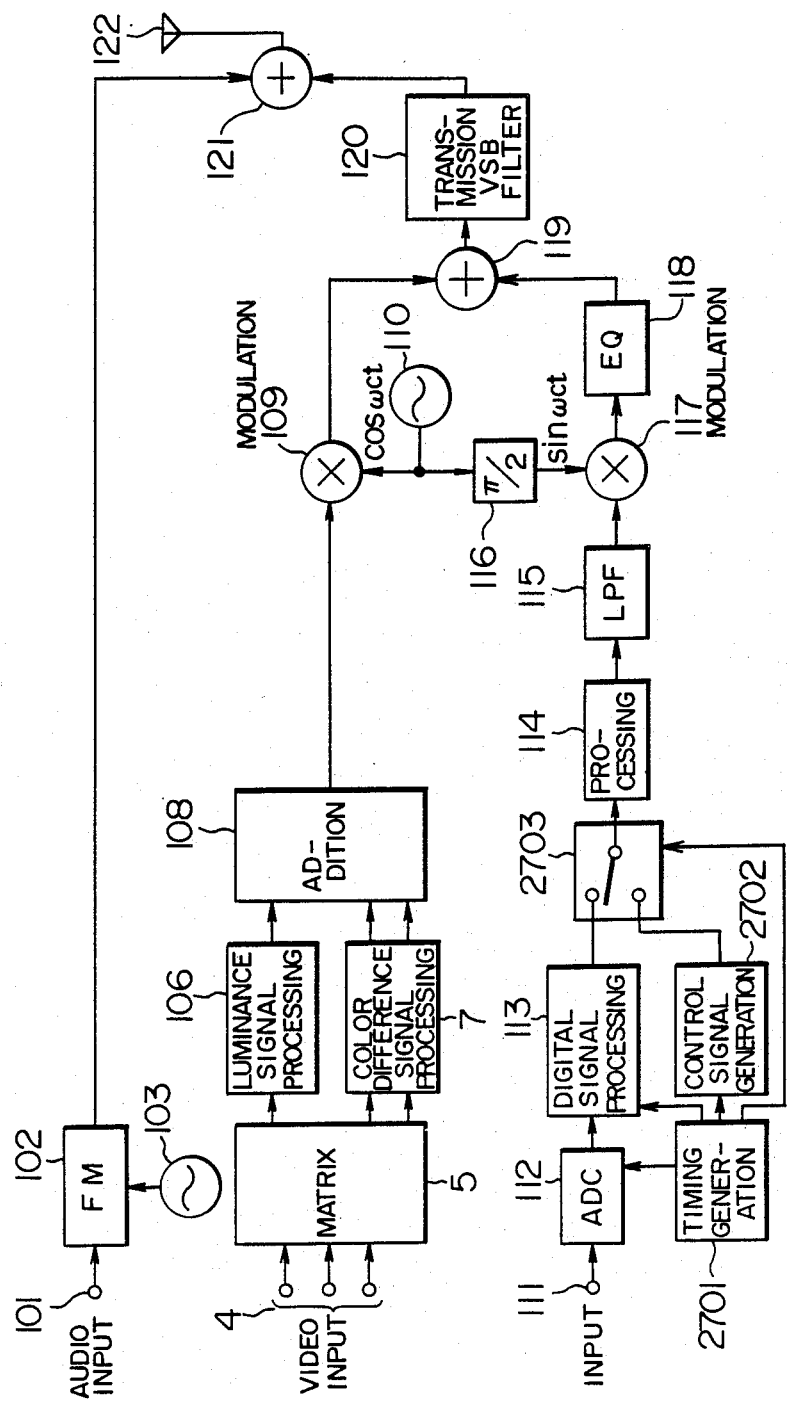
FIG. 27 is a block diagram of a further example of a transmission signal generation apparatus according to the present invention.

FIG. 27 shows another example of a block diagram of an embodiment of a transmission signal generation apparatus of television signal transmission according to the present invention. The same symbols as those of FIG. 1 represent identical functions. Numeral 2701 denotes a control circuit. Numerals 2702 and 2703 denote a control signal generation circuit and a changeover switch, respectively. In the present embodiment, a signal indicating the above described increase or decrease in the number of data contained in a pair of horizontal scanning periods and the horizontal scanning period having the increased or decreased data, a signal indicating which of the upper and lower horizontal scanning period data is the same as the top data of the horizontal scanning period with the exception of phase opposition, and a signal indicating the positional relationship with respect to the horizontal scanning period, for example, are added to the multiplex-transmitted signal. The output signal of the digital signal processing circuit 113 and the output signal of the control signal generation circuit 2702 are multiplexed in a time division scheme by the changeover switch 2703 controlled by the control circuit 2702. Only while the signal such as the control signal is multiplexed, the output of the digital signal processing circuit 113 is not transmitted. Accordingly, the data are compressed in time base by the digital signal processing circuit 113.

Figure 28:
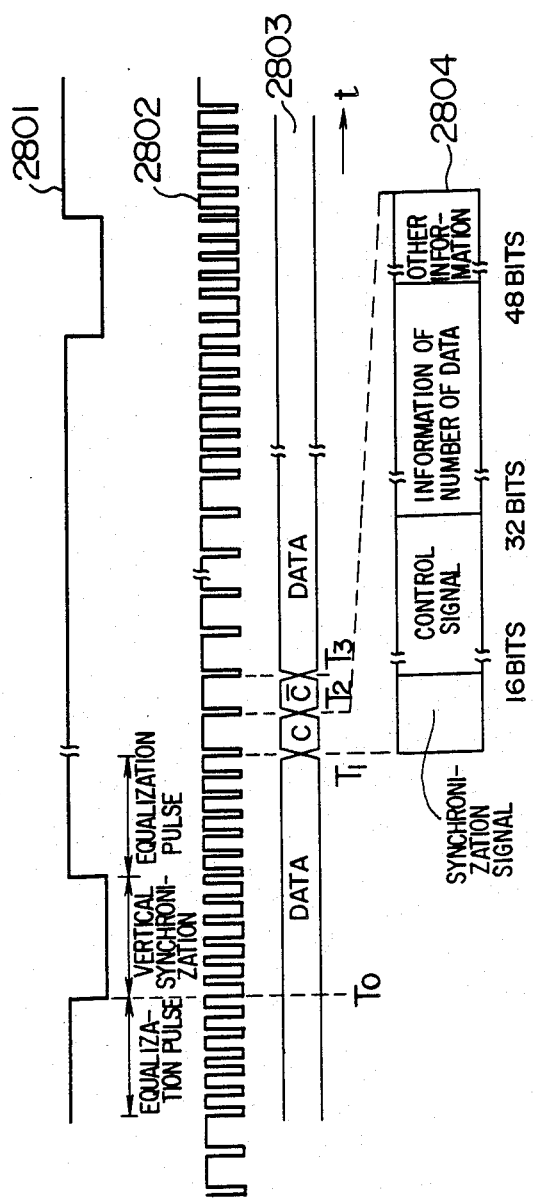
FIG. 28 shows an example of a signal used in explaining the operation of the apparatus of FIG. 27.

FIG. 28 shows an example of a signal multiplexed in a time division scheme in FIG. 27. Numeral 2801 denotes a vertical synchronizing signal, 2802 a horizontal synchronizing signal, 2803 an example of the multiplexed signal, and 2804 an example of a control signal. In two horizontal scanning periods following the vertical synchronization period and the equalization pulse period of the horizontal synchronizing signal 2802 of the television signal, control signals represented by C and $\overline{C}$ are transmitted. In a horizontal scanning period lasting from time $T_1$ to time $T_2$, the control signal C with positive phase is transmitted. In the next horizontal scanning period lasting from time $T_2$ to time $T_3$, the control signal with negative phase is transmitted. As shown in the control signal example 2804, the control signal includes a synchronizing signal having 16 bits, a control signal having 32 bits, the number of data information having 48 bits and other information. Two horizontal scanning periods within one vertical scanning period are used to transmit this control signal. In two vertical scanning periods having 525 horizontal scanning periods of the current NTSC television, four horizontal scanning periods are used to transmit this control signal. Accordingly, the ratio of the time base compression performed in the digital signal processing circuit 113 is not less than 525/521.

In the present embodiment as shown in FIGS. 27 and 28, control signals such as the polarity of the signal of a horizontal scanning period multiplex-transmitted in a quadrature form with respect to the adjacent horizontal scanning period, an increase or a decrease in the number of transmission data of the signal multiplex-transmitted during a horizontal scanning period, and the horizontal scanning period No. relating to the increase or decrease, and so on are multiplexed in a time division scheme. Therefore, the receiver for receiving and regenerating the quadrature multiplex-transmitted signal operates stably.

Figure 29:
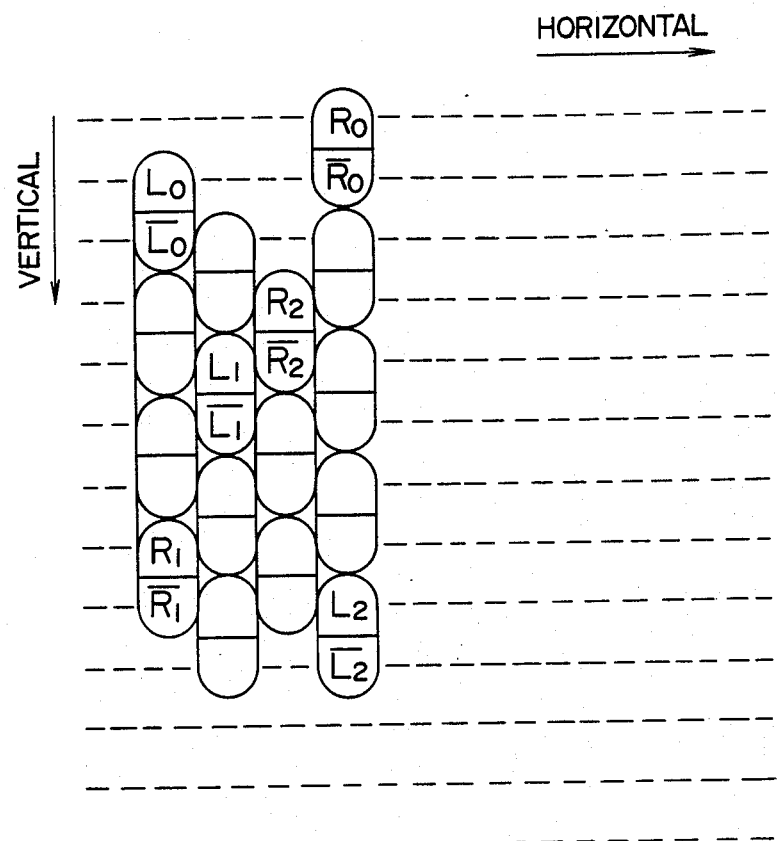
FIG. 29 shows a simulation diagram of an example of interleave processing of a transmission signal generation apparatus according to the present invention.

FIG. 29 is a transmission pattern diagram schematically showing an example of interleave processing of the digital signal processing circuit 113 in correspondence to the television screen of FIG. 25. The zeroth, first and second sampled data of the left channel of the audio signal are denoted by $L_0$, $L_1$ and $L_2$. The zeroth, first, and second sampled data of the right channel are denoted by $R_0$, $R_1$ and $R_2$. $\overline{L_0}$, $\overline{L_1}$, $\overline{L_2}$, $\overline{R_0}$, $\overline{R_1}$ and $\overline{R_2}$ are inverted data of $L_0$, $L_1$, $L_2$, $R_0$, $R_1$ and $R_2$, respectively. As evident from FIG. 29, it is a feature that with respect to the first sampled data $L_1$, the preceding $L_0$ and the succeeding $L_2$ are interleaved with a distance not shorter than a horizontal scanning period.

In the present embodiment, the preceding and succeeding adjacent sampled data are transmitted in different horizontal scanning periods by the interleave processing. For a picture (such as the horizon) in which the correlation between the upper and lower adjacent horizontal scanning periods is weak in the regeneration of the audio signal performed by the receiver shown in FIG. 20, therefore, the subtraction circuit 2001 does not significantly reduce the interference on the quadrature multiplex-transmitted signal caused by the video signal, certain sampled data tending to be erroneous. This erroneous sampled data is interpolated by preceding and succeeding sampled data, generation of abnormal noises being prevented.

In the foregoing description, one sampled data has one bit. Even if one sampled data has N bits, however, a similar effect is obtained because preceding and succeeding sampled data are located away from the same horizontal scanning period as that of the sampled data.

Figure 30:
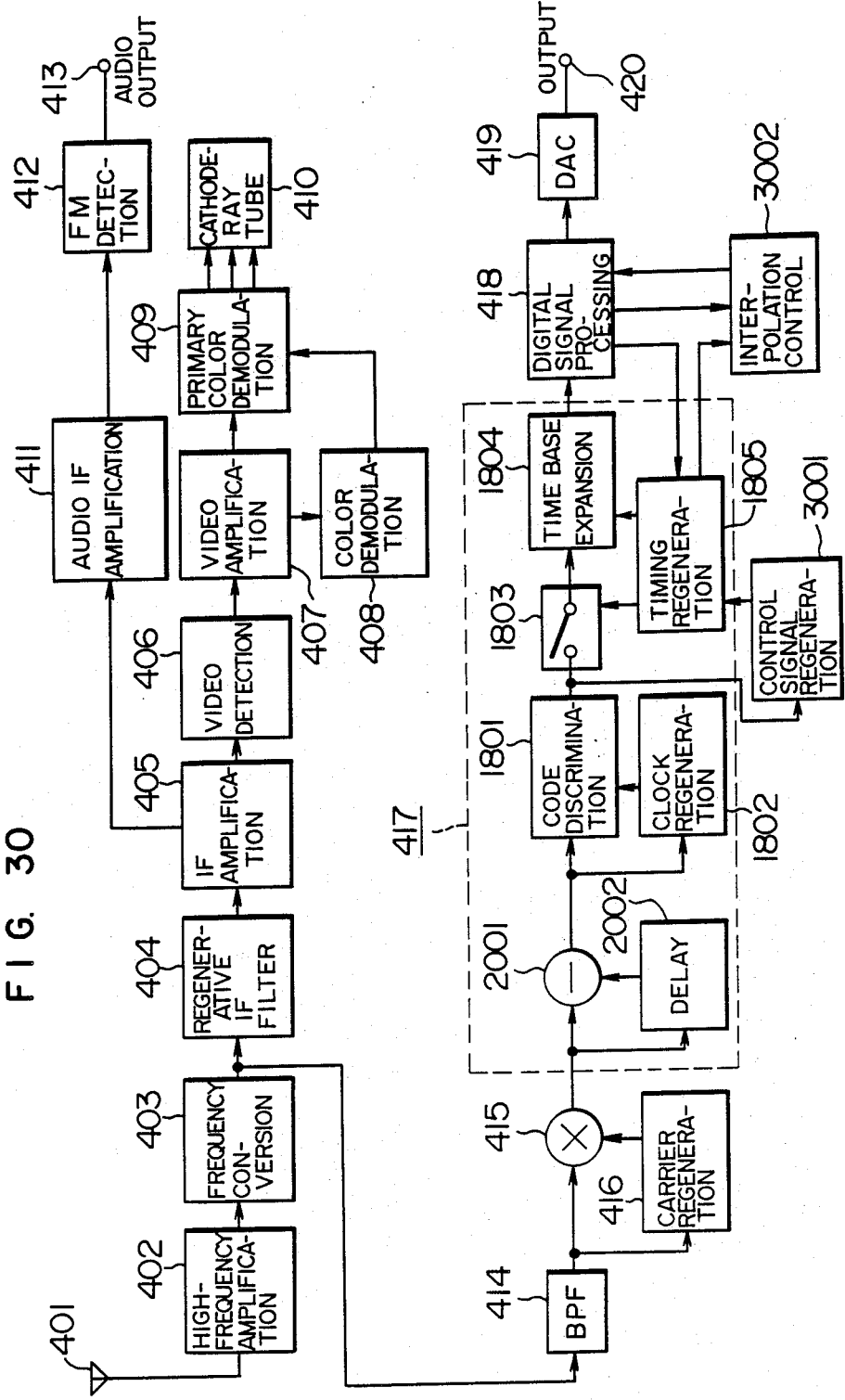
FIG. 30 is a block diagram of a further example of a transmission signal regeneration apparatus according to the present invention.

FIG. 30 is a block diagram of a further embodiment of a television transmission signal regenerating apparatus according to the present invention, and shows an example of a receiver for receiving and regenerating the transmission signal illustrated in FIGS. 27, 28 and 29. The same symbols as those of FIG. 20 represent identical functions. Numeral 3001 denotes a control signal regeneration circuit, and numeral 3002 denotes an interpolation control circuit.

From the output signal of the code discrimination circuit 1801, the control signal is taken out. On the basis of the control signal, the changeover switch 1803 is changed over by the signal supplied from the timing regeneration circuit 1805, necessary signals being obtained from the output signal of the code discrimination circuit 1801. The output signal of the changeover switch 1803 is expanded by the time base expansion circuit 1804. In the digital signal processing circuit 418, the expanded signal undergoes the detection and correction of errors caused during transmission and deinterleave processing, to be restored to the original transmission data. In the error detection and correction, errors caused by increased interference from the video signal and concentrated on a portion where the correlation of the video signal is weak cannot be corrected. In the digital signal processing circuit 418 controlled by the interpolation control circuit 3002, the erroneous sampling data which cannot be corrected is interpolated by the adjacent sampling data.

Since the regeneration using the control signal and interpolation using adjacent sampling data are performed in the present embodiment, stable regeneration becomes possible.

Figure 31:
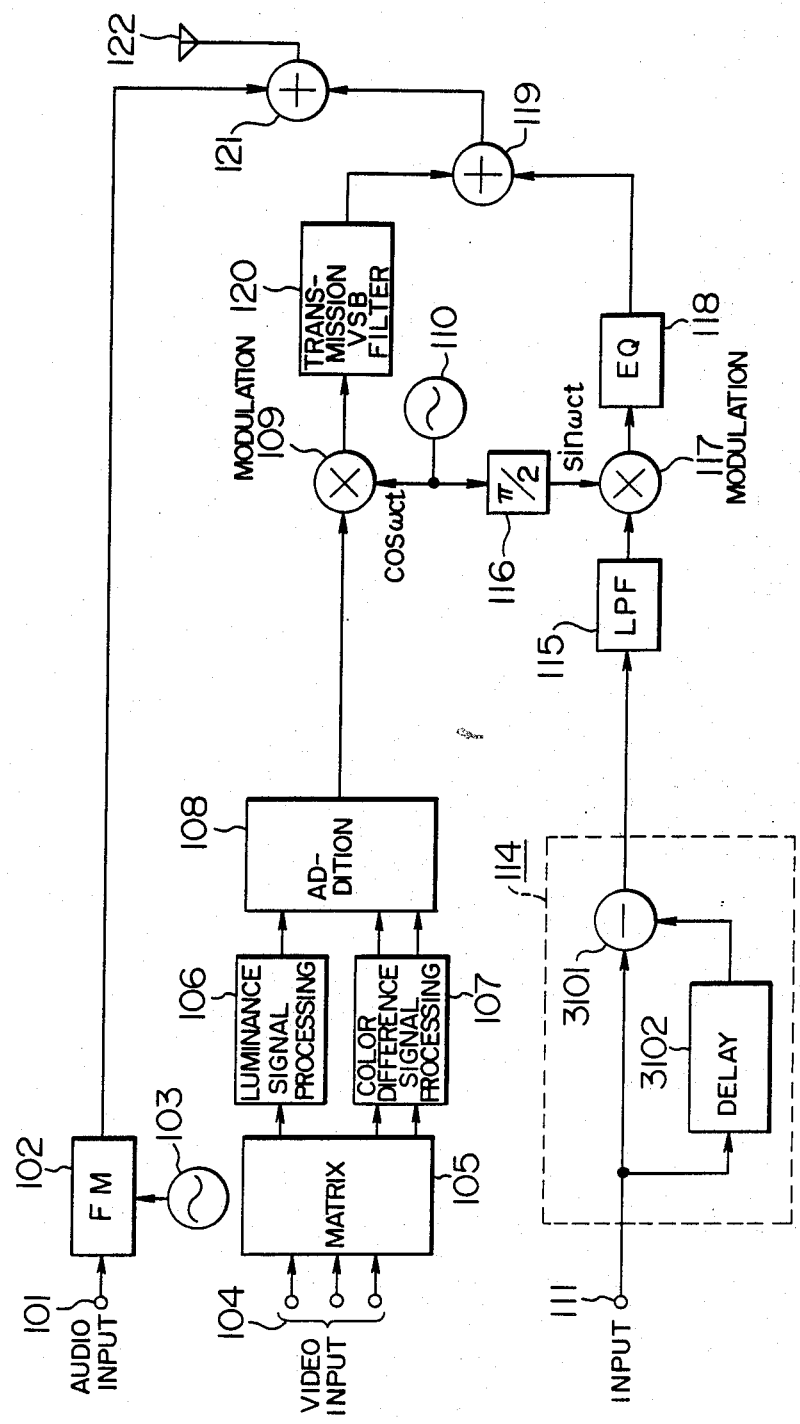
FIG. 31 is a block diagram of a further example of a transmission signal generation apparatus according to the present invention.

FIG. 31 is a block diagram of another embodiment of a transmission signal generation apparatus of television signal transmission according to the present invention. The same symbols as those of FIG. 1 represent identical functions. Numeral 114 denotes a spectrum suppression processing circuit. Numerals 3101 and 3102 denote a subtraction circuit and a delay circuit, respectively.

From the signal supplied to the input terminal 111, the signal delayed by delay time $\tau$ in the delay circuit 3102 is subtracted in the subtraction circuit 3101. If the frequency of the input signal is not higher than 20 kHz, for example, the signal can be transmitted by making the delay time $\tau$ approximately 10 $\mu$sec. Since the difference between the input signal and the delayed input signal is obtained in the subtraction circuit 3101, the difference becomes smaller as the frequency of the input signal component becomes lower. As a result, low-frequency components of the output signal of the spectrum suppression circuit 114 are reduced. Since the carrier is modulated by the output signal of the spectrum suppression circuit 114 in the modulation circuit 117, the signal which has been modulated is transmitted with components of the multiplex-transmitted signal located near the carrier frequency suppressed. This results in an effect that the interference on the current terrestrial television caused by the multiplex-transmitted signal can be reduced.

Figure 32:
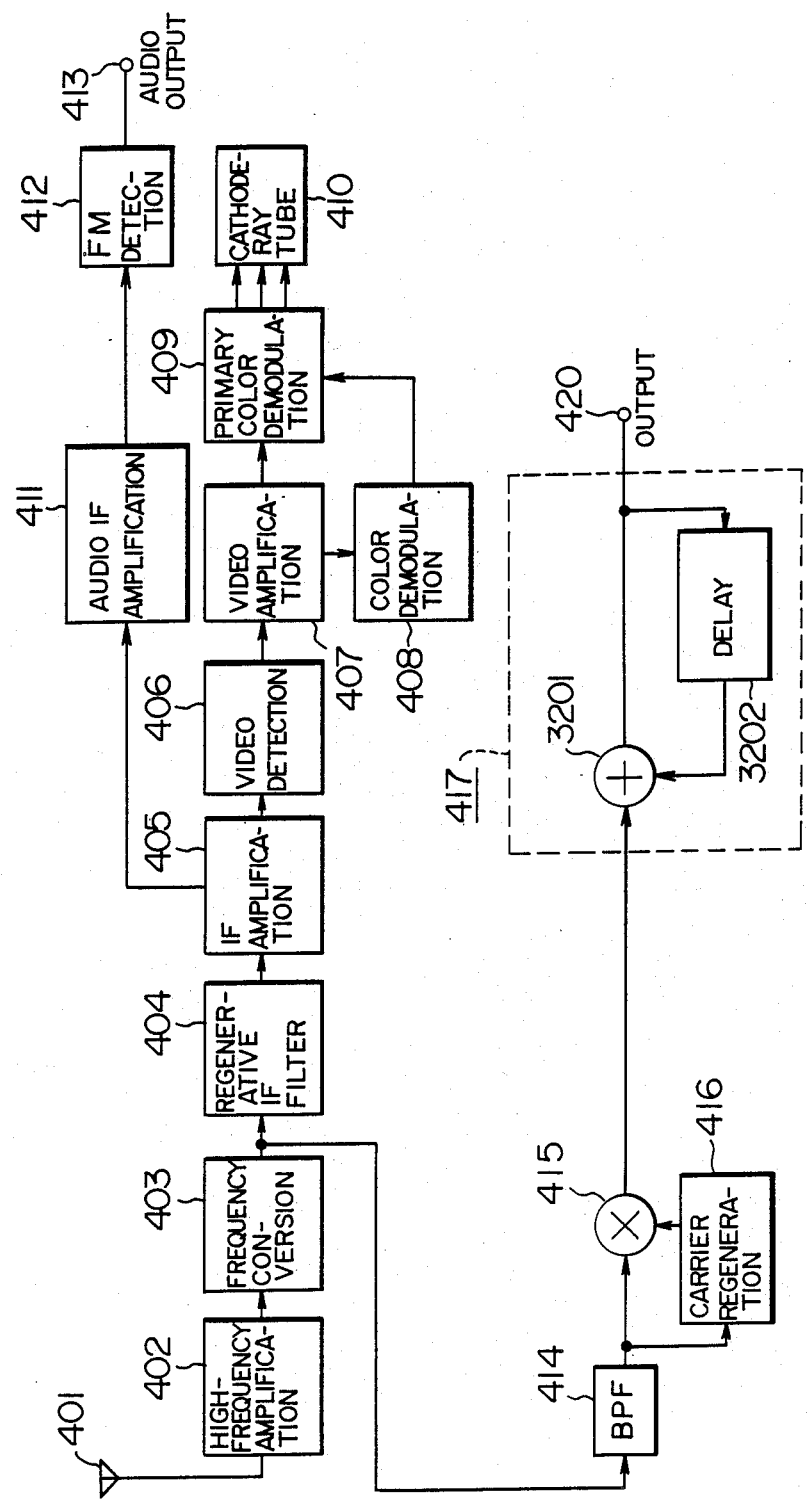
FIG. 32 is a block diagram of a further example of a transmission signal regeneration apparatus according to the present invention.

FIG. 32 is a block diagram showing another embodiment of a television signal reproducing apparatus according to the present invention. The same symbols as those of FIG. 4 represent identical functions. Numeral 417 denotes a spectrum suppression processing signal regeneration circuit. Numerals 3201 and 3202 denote an adder circuit, and a delay circuit, respectively.

By the spectrum suppression processing signal regeneration circuit 417, the output signal of the synchronous detection circuit 415 is restored to the input signal of the spectrum suppression processing signal regeneration circuit 114 at the output terminal 420. In the spectrum suppression processing signal regeneration circuit 417, the regeneration signal which is the output signal of the adder circuit 3201 is delayed by delay time $\tau$ in the delay circuit 3202, and then added to the output signal of the synchronous detection circuit 415 in the adder circuit 3201. The signal transmitted from the transmission signal generation apparatus so as to represent the difference between the current signal and a signal preceding the current signal by time $\tau$ is outputted from the synchronous detection circuit 415. The transmitted difference signal is added to the signal preceding the current signal by time $\tau$ to restore the original signal.

Figure 33:
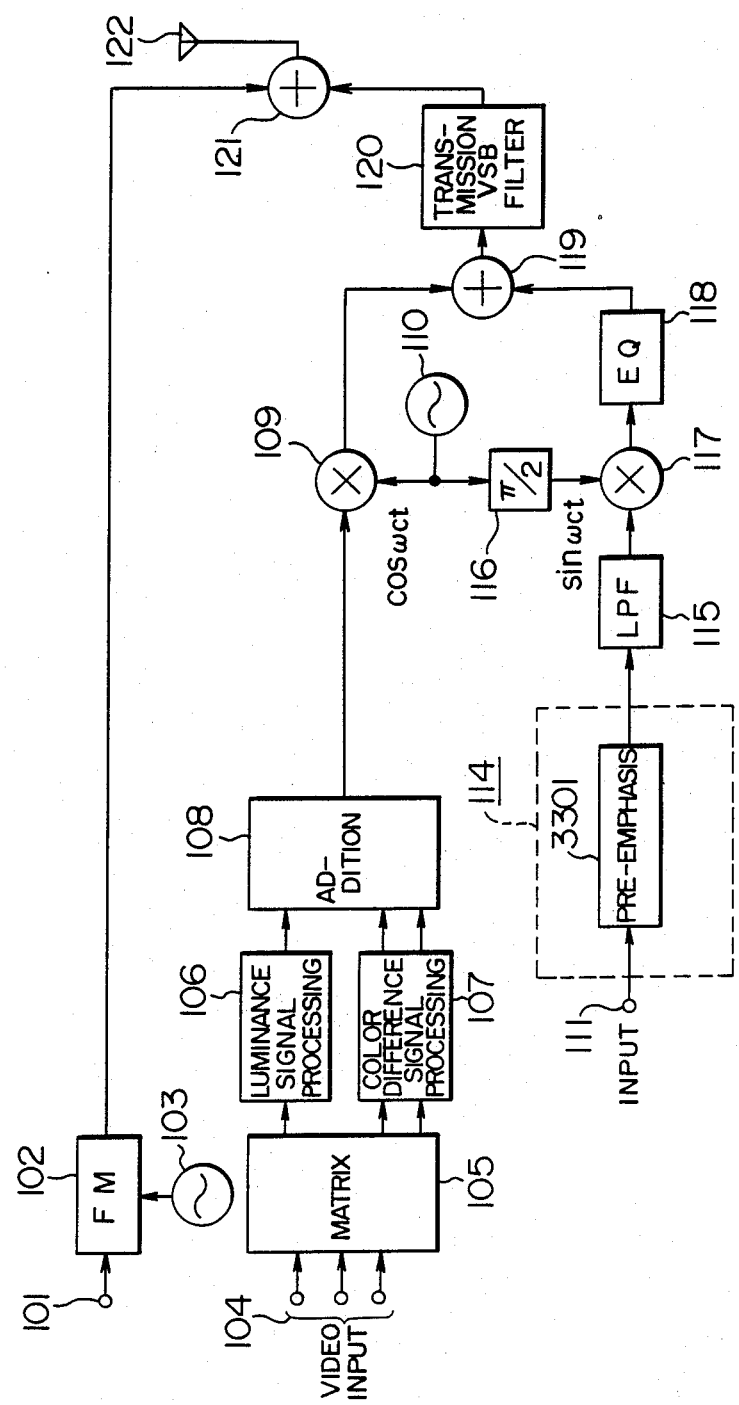
FIG. 33 is a block diagram of a further example of a transmission signal generation apparatus according to the present invention.

FIG. 33 shows another example of a block diagram of an embodiment of a transmission signal generating apparatus of television signal transmission according to the present invention. The same symbols as those of FIG. 1 represent identical functions. Numeral 114 denotes a spectrum suppression circuit, and numeral 3301 denotes a pre-emphasis circuit.

The signal supplied to the input terminal 111 is supplied to the pre-emphasis circuit 3301, low-frequency components of the signal being reduced. Since the carrier outputted by the phase-shifting circuit 116 is modulated by the signal having reduced low-frequency components in the modulation circuit 117, the modulated signal is transmitted with its components located near the carrier frequency suppressed.

Since in the present embodiment the components of the multiplex-transmitted signal located near the carrier frequency are suppressed, the interference on the television caused by the multiplex-transmitted signal can advantageously be reduced.

Figure 34:
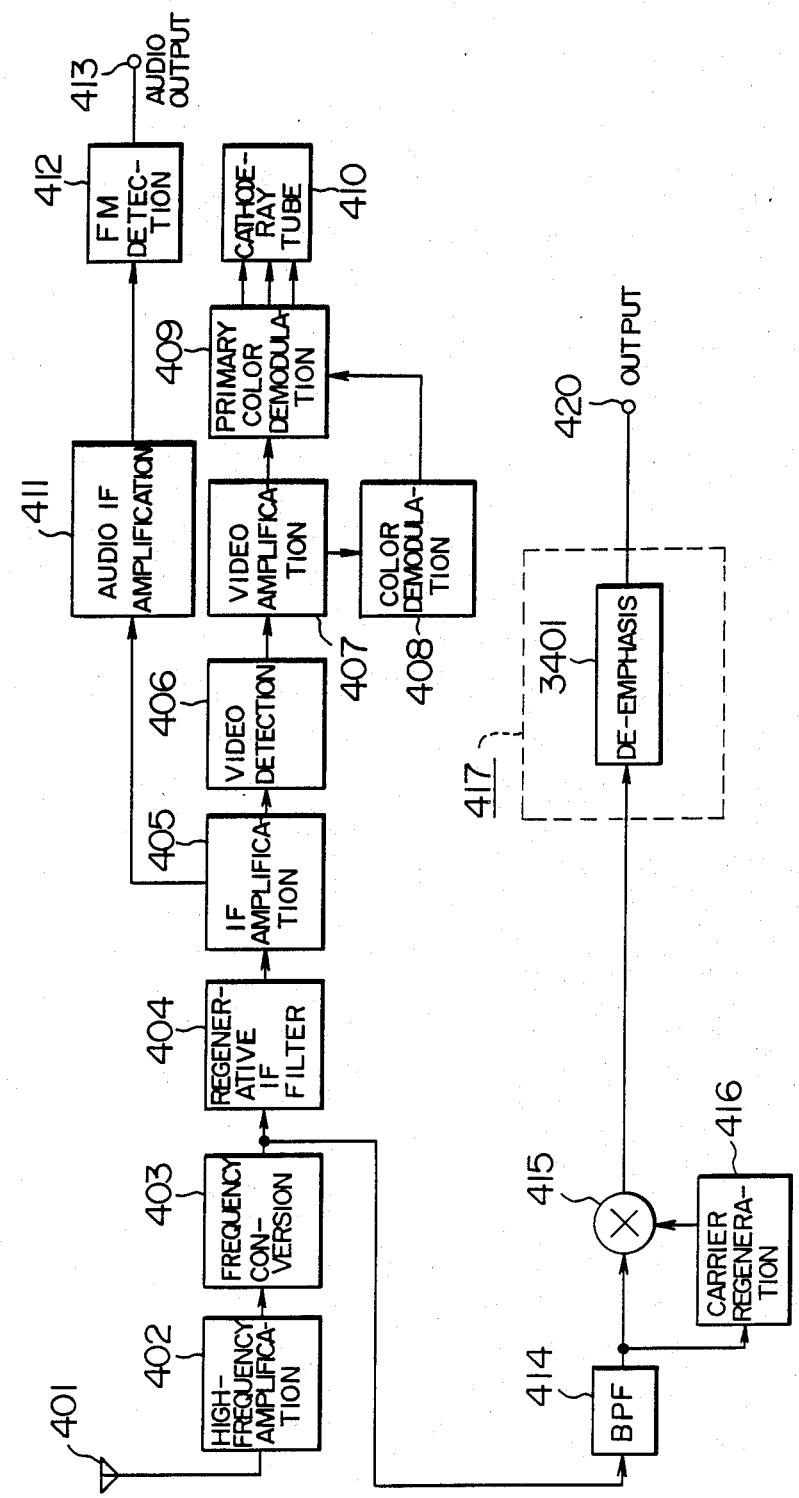
FIG. 34 is a block diagram of further example of a transmission signal regeneration apparatus according to the present invention.

FIG. 34 is a block diagram showing another example of a television transmission signal regeneration apparatus according to the present invention. The same symbols as those of FIG. 4 represent identical functions. Numeral 417 denotes a spectrum suppression processing signal regeneration circuit, and numeral 3401 denotes a de-emphasis circuit.

In the de-emphasis circuit 3401 within the spectrum suppression processing circuit 417, the output signal of the synchronous detection circuit 415 undergoes inverse processing with respect to the processing performed in the pre-emphasis circuit 3301 of the transmission signal generation apparatus shown in FIG. 33, the original signal being thus restored.

FIG. 35 is a block diagram showing another embodiment of a television transmission signal regeneration apparatus according to the present invention. The same symbols as those of FIG. 4 represent identical functions. Numeral 3501 denotes a band-pass filter, and numeral 3502 denotes a frequency conversion circuit.

FIG. 35 differs from FIG. 4 in that the frequency of the intermediate frequency signal of the quadrature multiplex-transmitted signal detected by the band-pass filter 3501 and the frequency conversion circuit 3502 is so defined as to be lower than the frequency of the detected intermediate frequency signal of the video signal. The intermediate frequency signal outputted from the frequency conversion circuit 403 is detected to demodulate the video signal. As the frequency of this intermediate frequency signal, 58.75 MHz is usually used in receivers of television of Japan. After the output signal of the frequency conversion circuit 403 has been further converted in the frequency conversion circuit 3502, it is detected in the synchronous detection circuit 415. In the frequency conversion circuit 3502, the frequency of the detected intermediate frequency signal is lowered to, say, approximately 5 MHz.

Since in the present embodiment the frequency used in the synchronous detection circuit 415 is low, the phase error due to the delay of the carrier regenerated in the carrier regeneration circuit 416, caused by the passage of the circuit, can be reduced, resulting in an effect that the quadrature multiplex-transmitted signal can be regenerated stably.

Figure 36:
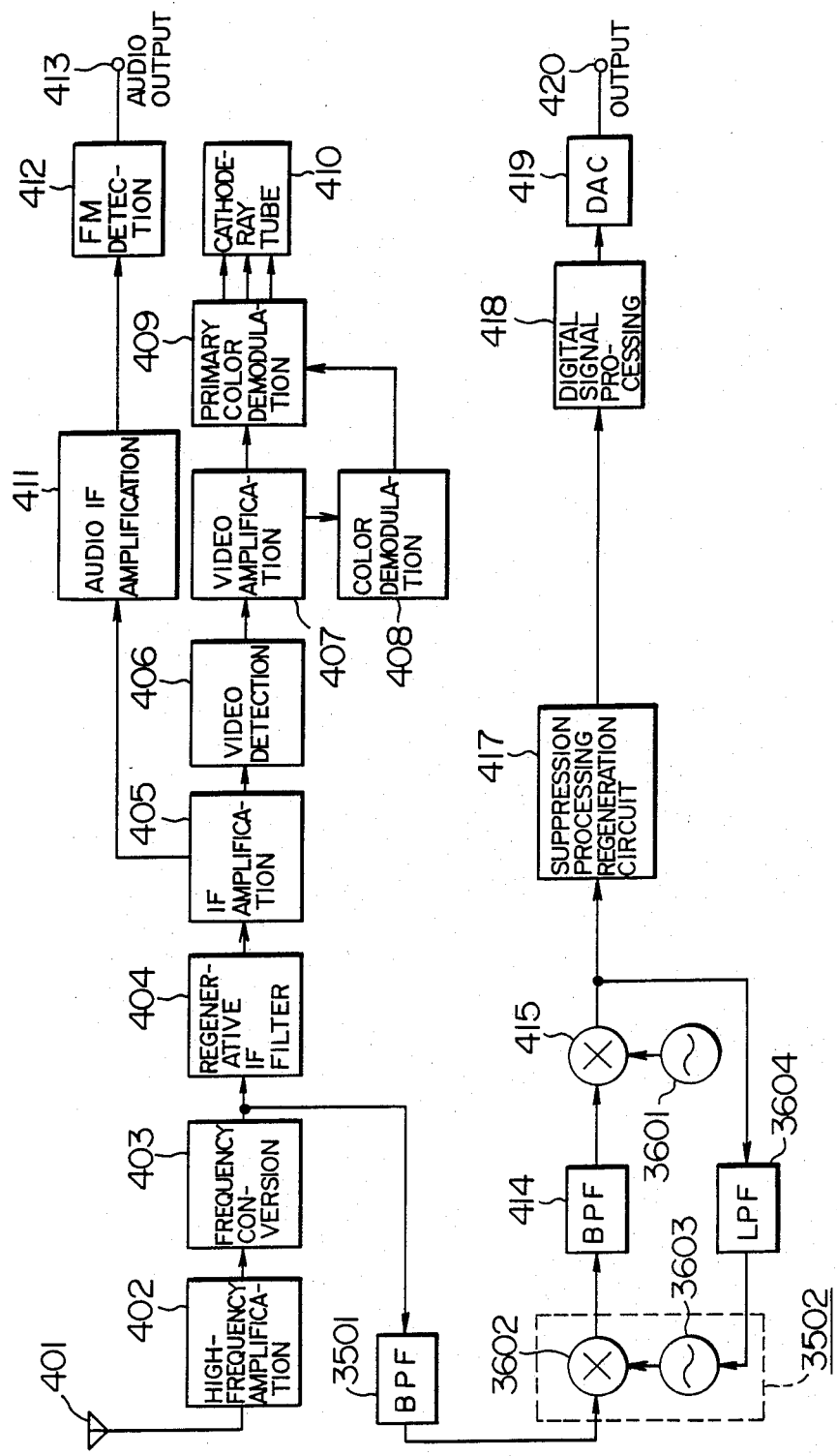
FIG. 36 shows a further example of a transmission signal regeneration apparatus according to the present invention.

FIG. 36 is a block diagram showing another embodiment of a television transmission signal regeneration apparatus according to the present invention. The same symbols as those of FIG. 4 or FIG. 35 represent identical functions. Numeral 3502 denotes a frequency conversion circuit, 3601 a reference signal generation circuit, 3602 a mixing circuit, 3603 a local oscillation circuit of voltage control type, and 3604 a low-pass filter. The frequency conversion circuit 3502 of FIG. 35 includes the mixing circuit 3602 and the local oscillation circuit 3603 of voltage control type.

Detection is performed by using the fact that the modulation by the multiplex-transmitted signal is quadrature with respect to the modulation by the video signal. The phase difference between the output signal of the band-pass filter 414 and the output signal of the reference signal generation circuit 3601 is detected by the synchronous detection circuit 415 and the low-pass filter 3604 and fed back to the local oscillation circuit 3603 of voltage control type. Accordingly, the carrier of the intermediate frequency signal outputted from the band-pass filter 414 is synchronized to the output signal of the reference signal generation circuit 3601, the quadrature multiplex-transmitted signal being obtained at the output of the synchronous detection circuit 415.

In the present embodiment, negative feedback is performed so that the frequency of the detected intermediate frequency signal may coincide with the signal frequency of the reference signal generation circuit 3601. Therefore, the shift in the tuning frequency of the band-pass filter 414 caused by the frequency drift of the local oscillation signal of the frequency conversion circuit 403, for example, is slight. This results in an effect that the quadrature multiplex-transmitted signal can be demodulated stably.

Figure 37:
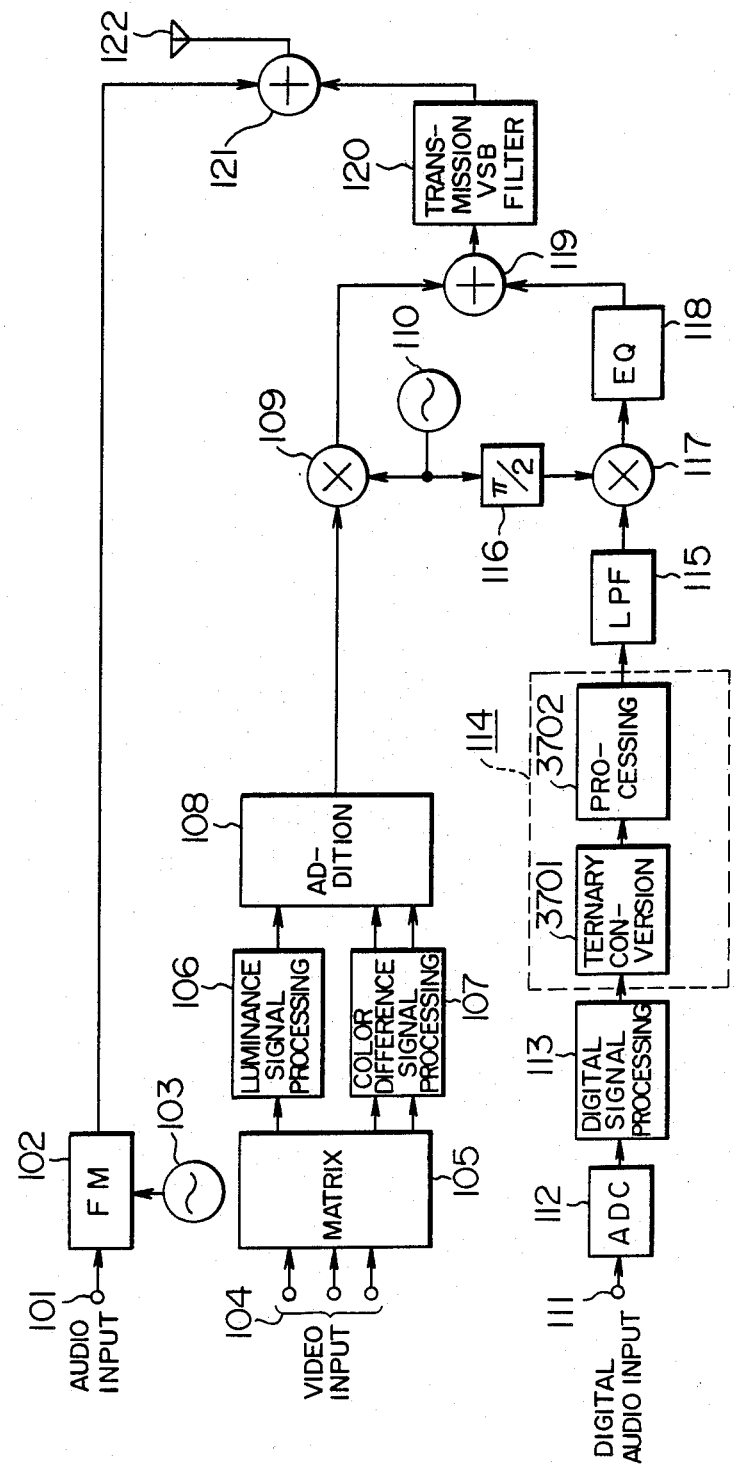
FIG. 37 is a block diagram of a further example of a transmission signal generation apparatus according to the present invention.

FIG. 37 shows another example of a block diagram of an embodiment of a transmission signal generation apparatus of television signal transmission according to the present invention. Numeral 114 denotes a spectrum suppression processing circuit. Numerals 3701 and 3702 denote a ternary conversion circuit and a processing circuit, respectively. The same symbols as those of FIG. 1 represent identical functions. In this example, the spectrum suppression processing circuit shown in FIG. 1 includes the ternary conversion circuit 3701 and the processing circuit 3702. The ternary conversion circuit 3701 includes the delay circuit 501 and the subtraction circuit 502 of FIG. 5. The processing circuit 3702 includes the time base compression circuit 1202, the timing generation circuit 1203, the inverter 1204, the delay circuit 1205, and the changeover switch 1206 of FIG. 12. In the present embodiment, therefore, the spectrum processing circuit 114 comprises a combination of the spectrum processing circuit 114 of FIG. 5 and that of FIG. 12 to further enhance the effect.

The digital code outputted by the digital signal processing circuit 113 is converted into a ternary digital code $+1$, 0 or $-1$ by the ternary conversion circuit 3701. In the processing circuit 3702, processing for inverting and transmitting data in adjacent horizontal scanning periods is repeated a plurality of times and every other horizontal scanning period. Since the detailed explanation has been given with reference to FIGS. 5 and 12, it will be omitted here.

In the present embodiment, components of the multiplex-transmitted signal located near the carrier frequency are suppressed by the ternary conversion circuit 3701, and components located near a frequency indicated by the reciprocal of the fixed interval are also suppressed by processing circuit 3702. Therefore, the interference on the current terrestrial television caused by the multiplex-transmitted signal can advantageously be further reduced.

Figure 38:
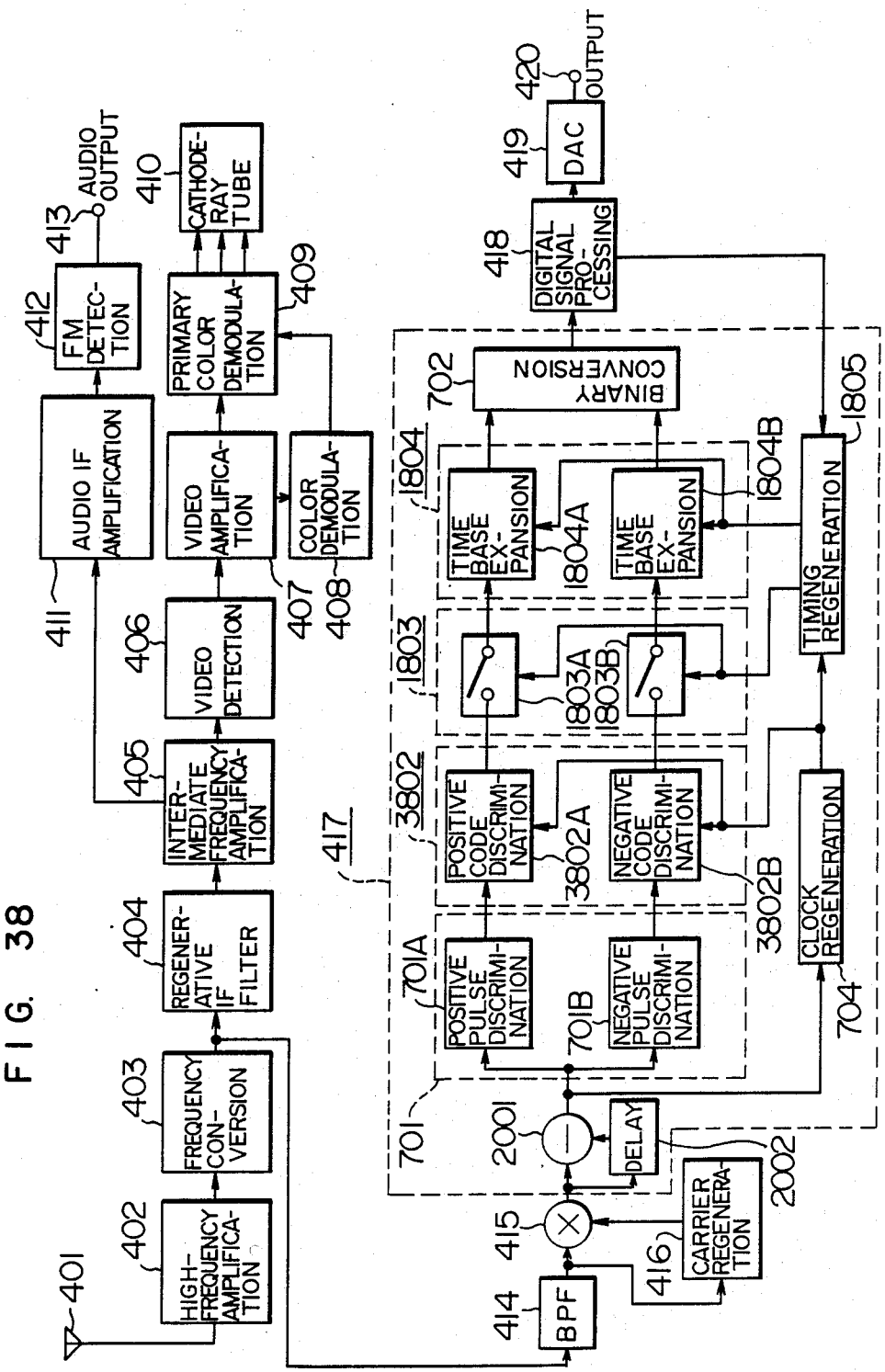
FIG. 38 is a block diagram of a further example of a transmission signal regeneration apparatus according to the present invention.

FIG. 38 is a block diagram showing another embodiment of a television transmission signal regeneration apparatus according to the present invention. Numeral 417 denotes a spectrum suppression processing signal regeneration circuit, 701 a ternary discrimination circuit, 1803 a changeover circuit, 1804 a time base expansion circuit, 3802 a code discrimination circuit, 701A a positive pulse discrimination circuit, 701B a negative pulse discrimination circuit, 3802A a positive pulse detection signal code discrimination circuit, 3802B a negative pulse detection signal code discrimination circuit, 1803A a switch for positive pulse detection signal, 1803B a switch for negative pulse detection signal, 1804A a time base expansion circuit for positive pulse detection signal, and numeral 1804B denotes a time base expansion circuit for negative pulse detection signal. The same symbols as those of FIGS. 4, 7 and 20 represent identical functions.

In the present embodiment, the embodiment of FIG. 7 is combined with the embodiment of FIG. 20 to further enhance the effect.

The output signal of the synchronous detection circuit 415 and a signal obtained by delaying it by one horizontal scanning period in the delay circuit 2002 undergo subtraction in the subtraction circuit 2001. The positive pulse of the subtracted signal is discriminated in the positive pulse discrimination circuit 701A, a binary signal being outputted. The negative pulse of the subtracted signal is discriminated in the negative pulse discrimination circuit 701B, a binary signal being outputted. To be concrete, the positive pulse discrimination circuit 701A and the negative pulse discrimination circuit 701B include the voltage comparison circuit 805 and the voltage comparison circuit 806, respectively. The discriminated positive pulse is coded by the code discrimination circuit 3802A and the clock regeneration circuit 704. The discriminated negative pulse is coded by the code discrimination circuit 3802B and the clock regeneration circuit 704. By the switches 1803A and 1803B, the time base expansion circuits 1804A and 1804B, and the timing regeneration circuit 1805, necessary data trains are regenerated from the positive and negative pulses. The transmitted binary codes are thus regenerated by the binary conversion circuit 702. Since detailed explanation of the operation was given with reference to FIGS. 7 and 20, it will be omitted here.

Since in the present embodiment the configuration of FIG. 20 is added to that of FIG. 7, the signal transmitted as shown in FIG. 37 can be regenerated and the interference from the video signal caused by ghosts or the like can also be advantageously reduced.

As the transmission system in which the carrier is amplitude-modulated, the case where the carrier is a video signal and the vestigial-sideband amplitude modulation is used, i.e., the case of the television signal transmission system has heretofore been mainly described. However, it is a matter of course that any amplitude modulation scheme may be used in the transmission system in which the carrier is amplitude-modulated.

As the multiplex signal for modulating the quadrature carrier, digital-coded signal data has heretofore been mainly described. However, this multiplex signal is not limited to a digital signal, but may be a usual analog signal.

In accordance with the present invention, components of the multiplex modulation signal located near the carrier frequency are suppressed when the carrier having a quadrature phase with respect to the carrier of the signal transmitted by means of amplitude modulation is modulated by the multiplex-transmitted signal. This results in an effect that the signal transmitted by means of amplitude modulation and demodulated is not easily affected by the multiplex-transmitted signal.

Further, in case an identical signal is transmitted after a fixed interval with the phase inverted to suppress components of the multiplex modulation signal located near the carrier frequency, the multiplex transmitted signal and a signal obtained by delaying it by fixed time undergo subtraction operation for demodulation in the regeneration apparatus. Therefore, the interference from the signal transmitted by means of amplitude modulation can also be reduced.

We claim:

1. A multiplex transmission system comprising a carrier signal source; means for amplitude-modulating and transmitting the carrier signal from said carrier signal source; and a multiplex transmission system including a source of a quadrature signal having a quadrature phase with respect to the carrier signal, means for modulating the quadrature signal by a multiplex signal so as to perform spectrum suppression processing for suppressing at least multiplex signal components located near the carrier signal frequency, means for combining the quadrature signal with the amplitude-modulated carrier signal, means for transmitting the thus combined signal, and means for delaying the multiplex signal by a fixed time, said means for modulating including means for applying waveform computation processing to the delayed multiplex signal and to the non-delayed multiplex signal.

2. A multiplex transmission system comprising a carrier signal source; means for amplitude modulating and transmitting the carrier signal from said carrier signal source; and a multiplex transmission system including a source of a quadrature signal having a quadrature phase with respect to the carrier signal, means for modulating the quadrature signal by a multiplex signal so as to perform spectrum suppression processing for suppressing at least multiplex signal components located near the carrier signal frequency, means for combining the quadrature signal with the amplitude-modulated carrier signal, and means for transmitting the thus combined signal, said modulating means comprising means for providing as the multiplex signal a signal supplied with emphasis characteristics so as to suppress low-frequency components thereof, and means for modulating the quadrature signal by the multiplex signal.

3. A multiplex transmission system comprising a carrier signal source; means for amplitude-modulating and transmitting the carrier signal from said carrier signal source; and a multiplex transmission system including a source of a quadrature signal having a quadrature phase with respect to the carrier signal, a source of a multiplex signal including digital coded signal data, means for delaying the multiplex signal including one data or less by a fixed time; means for modulating the quadrature signal by a signal obtained by applying subtraction processing to the thus delayed multiplex signal and to the non-delayed multiplex signal so as to perform spectrum suppression processing for suppressing at least multiplex signal components located near the carrier signal frequency, means for combining the modulated quadrature signal with the amplitude modulated carrier signal, and means for transmitting the thus combined signals.

4. A multiplex transmission system comprising a carrier signal source; means for amplitude-modulating and transmitting the carrier signal from said carrier signal source; and a multiplex transmission system including a source of a quadrature signal having a quadrature phase with respect to the carrier signal, means for modulating the quadrature signal by a multiplex signal so as to perform spectrum suppression processing for suppressing at least multiplex signal components located near the carrier signal frequency, means for combining the quadrature signal with the amplitude-modulated carrier signal, and means for transmitting the thus combined signal, said means for amplitude-modulating and transmitting the carrier signal comprising a source of a video signal and means for applying vestigial-sideband amplitude modulation with the video signal to the carrier signal and transmitting the resultant signal.

5. A multiplex transmission system according to claim 1 wherein said means for amplitude-modulating and transmitting the carrier signal comprises a source of a video signal and a transmission system for applying vestigial-sideband amplitude modulation with the video signal to the carrier signal and transmitting the resultant signal.

6. A multiplex transmission system according to claim 2, wherein said means for amplitude modulating and transmitting the carrier signal comprises a source of a video signal and a transmission system for applying vestigial-sideband amplitude modulation with the video signal to the carrier signal and transmitting the resultant signal.

7. A multiplex transmission system according to claim 3, wherein said means for amplitude modulating and transmitting the carrier signal comprises a source of a video signal and a transmission system for applying vestigial-sideband amplitude modulation with the video signal to the carrier signal and transmitting the resultant signal.

8. A multiplex transmission system according to claim 3, wherein said means for amplitude-modulating and transmitting the carrier signal comprises a source of a video signal and a transmission system for applying vestigial-sideband amplitude modulation with the video signal to the carrier signal and transmitting the resultant signal.

9. A multiplex transmission system according to claim 4, wherein said modulating means comprises means for applying inversion processing every other scanning period of the video signal to the multiplex signal; and means for modulating the quadrature carrier by the inversion-processed signal.

10. A multiplex transmission system according to claim 4, wherein said modulating means comprises:
means for compressing the multiplex signal to half or less on a time base so as to result in a period;
means for delaying a signal selected from either the compressed multiplex signal or a signal obtained by inverting the compressed multiplex signal by one scanning period of the video signal;
means for adding the delayed selected signal and the undelayed selected signal, the period being chosen so as not to overlap signals on the time base as a result of the addition; and
means for modulating the quadrature carrier by the added signal.

11. A multiplex transmission system according to claim 4, wherein said modulating means comprises means for applying inversion processing every other scanning period of the horizontal video signal to the multiplex signal; and means for modulating the quadrature carrier by the inversion-processed signal 12. A multiplex transmission system according to claim 4, wherein said modulating means comprises:
means for compressing the multiplex signal to half or less on a time base so as to result in a period;
means for delaying a signal selected from either the compressed multiplex signal or a signal obtained by inverting the compressed multiplex signal by one scanning period of the horizontal video signal;
means for adding the delayed selected signal and the undelayed selected signal, the period being chosen so as not to overlap signals on the time base as a result of the addition; and
means for modulating the quadrature carrier by the added signal.

13. A multiplex transmission system according to claim 7, wherein said modulating means comprises:
means for delaying the multiplex signal by a fixed time corresponding to one data or less;
means for applying subtraction processing to the delayed multiplex signal and the undelayed multiplex signal;
means for applying inversion processing to the resultant subtraction-processed multiplex signal every other scanning period of the video signal; and
means for modulating the quadrature carrier by the resultant inversion-processed signal.

14. A multiplex transmission system according to claim 7, wherein said modulating means comprises:
means for delaying the multiplex signal by a fixed time corresponding to one data or less;
means for applying subtraction processing to the delayed multiplex signal and the undelayed multiples signal;
means for compressing the resultant subtraction processed signal to half or less on a time base so as to result in a period;
means for delaying a signal selected from either the compressed multiplex signal or a signal obtained by inverting the compressed multiplex signal by one scanning period of the video signal;
means for adding the delayed selected signal and the undelayed selected signal, the period being chosen so as not to overlap signals on the time base as a result of the addition; and
means for modulating the quadrature carrier by the added signal.

15. In a signal generation apparatus having an amplitude modulation circuit for amplitude-modulating a carrier signal outputted from a carrier generation circuit, a multiplex transmission signal generation apparatus comprising:
a phase-shifting circuit responsive to the carrier signal for providing a quadrature signal having a quadrature phase with respect to the carrier signal;
a multiplex signal source;
a spectrum suppression processing modulation circuit for modulating the quadrature signal by the multiplex signal and for suppressing components of the multiplex signal located near the carrier signal frequency, said spectrum suppression processing modulation circuit comprising:
(a) a delay circuit for delaying the multiplex signal;
(b) a computation processing circuit for applying signal processing such as subtraction processing to the multiplex signal and the output signal of said delay circuit; and
(c) a modulation circuit for modulating the quadrature circuit; and
a combination circuit for combining the output signal of said amplitude modulation circuit with the output signal of said spectrum suppression processing modulation circuit.

16. In a signal generation apparatus having an amplitude modulation circuit for amplitude-modulating a carrier signal outputted from a carrier generation circuit, a multiplex transmission signal generation apparatus comprising:
a phase-shifting circuit responsive to the carrier signal for providing a quadrature signal having a quadrature phase with respect to the carrier signal;
a multiplex signal source;
a spectrum suppression processing modulation circuit for modulating the quadrature signal by the multiplex signal and for suppressing components of the multiplex signal located near the carrier signal frequency, said spectrum suppression processing modulation circuit comprising:
(a) an emphasis circuit for suppressing low-frequency components of the multiplex signal; and
(b) a modulation circuit for modulating the quadrature signal by the output signal of said emphasis circuit; and a combination circuit for combining the output signal of said amplitude modulation circuit with the output signal of said spectrum suppression processing modulation circuit.

17. In a signal generation apparatus having an amplitude modulation circuit for amplitude-modulating a carrier signal outputted from a carrier generation circuit, a multiplex transmission signal generation apparatus comprising:
   a phase-shifting circuit responsive to the carrier signal for providing a quadrature signal having a quadrature phase with respect to the carrier signal;
   a multiplex signal source for providing a multiplex signal in the form of digital-coded signal data;
   a spectrum suppression processing modulation circuit for modulating the quadrature signal by the multiplex signal and for suppressing components of the multiplex signal located near the carrier signal frequency; and
   a combination circuit for combining the output signal of said amplitude modulation circuit with the output signal of said spectrum suppression processing modulation circuit.

18. A multiplex transmission signal generation apparatus according to claim 17, wherein said spectrum suppression processing modulation circuit comprises:
   a delay circuit for delaying by a time corresponding to the duration of one data or less;
   a computation circuit for applying signal processing such as subtraction processing to the multiplex signal and the output signal of said delay circuit; and
   a modulation circuit for modulating the quadrature signal by the output signal of said computation circuit.

19. A multiplex transmission signal generation apparatus comprising;
   a carrier signal generation circuit;
   a video signal source;
   an amplitude modulation circuit for amplitude-modulating the carrier signal outputted from said carrier generation circuit, said amplitude modulation circuit including an amplitude modulation circuit for applying vestigial-sideband amplitude modulation with the video signal to the carrier signal;
   a phase-shifting circuit responsive to the carrier signal for providing a quadrature signal having a quadrature phase with respect to the carrier signal;
   a multiplex signal source;
   a spectrum suppression processing modulation circuit for modulating the quadrature signal by the multiplex signal and for suppressing components of the multiplex signal located near the carrier signal frequency; and
   a combination circuit for combining the output signal of said amplitude modulation circuit with the output signal of said spectrum suppression processing modulation circuit.

20. A multiplex transmission signal generation apparatus according to claim 15, wherein said amplitude modulation circuit for amplitude-modulating the carrier comprises a video signal source; and an amplitude modulation circuit for applying vestigial-sideband amplitude modulation with the video signal to the carrier signal.

21. A multiplex transmission signal generation apparatus according to claim 16, wherein said amplitude modulation circuit for amplitude-modulating the carrier comprises a video signal source; and an amplitude modulation circuit for applying vestigial-sideband amplitude modulation with the video signal to the carrier signal.

22. A multiplex transmission signal generation apparatus according to claim 17, wherein said amplitude modulation circuit for amplitude-modulating the carrier comprises a video signal source; and an amplitude modulation circuit for applying vestigial-sideband amplitude modulation with the video signal to the carrier signal.

23. A multiplex transmission signal generation apparatus according to claim 18, wherein said amplitude modulation circuit for amplitude-modulating the carrier comprises a video signal source; and an amplitude modulation circuit for applying vestigial-sideband amplitude modulation with the video signal to the carrier signal.

24. A multiplex transmission signal generation apparatus according to claim 19, wherein said spectrum suppression processing modulation circuit comprises:
   a video signal source;
   an inversion circuit for applying inversion processing to the multiplex signal every other scanning period of the video signal; and
   a modulation circuit for modulating the quadrature signal by the output signal of said inversion circuit.

25. A multiplex transmission signal generation apparatus according to claim 19, wherein said spectrum suppression processing modulation circuit comprises:
   a video signal source;
   a time base compression circuit for compressing the multiplex signal to half or less on a time base so as to result in a time period;
   an inversion circuit for inverting the output of said time base compression circuit;
   a delay circuit for delaying a signal selected from either the output of said time base compression circuit or the output of said inversion circuit, by one scanning period of the video signal;
   an adder circuit for adding the delayed selected signal and the undelayed selected signal, the time period being so chosen as not to overlap signals on the time base as a result of the addition; and
   a modulation circuit for modulating the quadrature signal by the output of said adder circuit.

26. A multiplex transmission signal generation apparatus according to claim 19, wherein said spectrum suppression processing modulation circuit comprises:
   a video signal source;
   an inversion circuit for applying inversion processing to the multiplex signal every other horizontal scanning period of the video signal; and
   a modulation circuit for modulating the quadrature signal by the output signal of said inversion circuit.

27. A multiplex transmission signal generation apparatus according to claim 19, wherein said spectrum suppression processing modulation circuit comprises:
   a video signal source;
   a time base compression circuit for compressing the multiplex signal to half or less on a time base so as to result in a time period;
   an inversion circuit for inverting the output of said time base compression circuit;
   a delay circuit for delaying a signal selected from either the output of said time base compression circuit or the output of said inversion circuit by one horizontal scanning period of the video signal;
   an adder circuit for adding the delayed selected signal and the undelayed selected signal, the time period being so chosen as not to overlap signals on the time base as a result of the addition; and a modulation circuit for modulating the quadrature signal by the output of said adder circuit.

28. A multiplex transmission signal generation apparatus according to claim 22, wherein said spectrum suppression processing modulation circuit comprises:
 a delay circuit for delaying the multiplex signal by a time corresponding to the duration of one data or less;
 a computation circuit for applying signal processing such as subtraction processing to the multiplex signal and the output signal of said delay circuit;
 a video signal source;
 an inversion circuit for applying inversion processing to the output signal of said computation circuit every other scanning period of the video signal; and
 a modulation circuit for modulating the quadrature signal by the output signal of said inversion circuit.

29. A multiplex transmission signal generation apparatus according to claim 22, wherein said spectrum suppression processing modulation circuit comprises:
 a first delay circuit for delaying by a time corresponding to the duration of one data or less;
 a computation circuit for applying signal processing such as subtraction processing to the multiplex signal and the output signal of said first delay circuit;
 a time base compression circuit for compressing the output signal of said computation circuit to half or less on a time base so as to result in a time period;
 a video signal source;
 an inversion circuit for inverting the output of said time base compression circuit;
 a second delay circuit for delaying a signal selected from either the output of said time base compression circuit or the output of said inversion circuit by one scanning period of the video signal;
 an adder circuit for adding the delayed selected signal and the undelayed selected signal, said time period being so chosen as not to overlap signals on the time base as a result of the addition; and
 a modulation circuit for modulating the quadrature signal by the output of said adder circuit.

30. A multiplex transmission signal regeneration apparatus for receiving and regenerating a transmitted multiplex transmission signal obtained by combining an amplitude-modulated carrier signal with a quadrature signal having a quadrature phase with respect to the carrier signal and modulated by a multiplex signal so processed in spectra as to suppress signal components located near the carrier signal frequency, comprising:
 a carrier regeneration circuit for regenerating the carrier signal from the multiplex transmission signal;
 a synchronous detection circuit for detecting the multiplex transmission signal by the output signal of said carrier regeneration circuit; and
 a spectrum suppression processing signal regeneration circuit for demodulating the multiplex signal from the output signal of said synchronous detection circuit.

31. A multiplex transmission signal regeneration apparatus according to claim 30, wherein said spectrum suppression processing signal regeneration circuit comprises:
 a delay circuit for delaying the output signal of said synchronous detection circuit; and
 a processing circuit for applying signal processing such as addition processing to the output signal of said synchronous detection circuit and the output signal of said delay circuit.

32. A multiples transmission signal regeneration apparatus according to claim 30, wherein said spectrum suppression processing signal regeneration circuit comprises a de-emphasis circuit for emphasizing low-frequency components of the multiplex signal.

33. A multiplex transmission signal regeneration apparatus according to claim 30, wherein said spectrum suppression processing signal regeneration circuit demodulated the multiplex signal in the form of digital-coded signal data.

34. A multiplex transmission signal regeneration apparatus according to claim 33, wherein said spectrum suppression processing signal regeneration circuit comprises:
 first and second voltage comparison circuits supplied with the output signal of said synchronous detection circuit;
 first and second reference voltage sources for supplying comparison reference voltages to said first and second voltage comparison circuits; and
 a binary conversion circuit activated by the output signals of said first and second voltage comparison circuits.

35. A multiplex transmission signal regeneration apparatus according to claim 30, further comprising a video signal source; and wherein said carrier regeneration circuit regenerates the amplitude-modulated carrier in the form of a carrier which has undergone vestigial-sideband amplitude modulation with the video signal.

36. A multiplex transmission signal regeneration apparatus according to claim 31, further comprising a video signal source; and wherein said carrier regeneration circuit regenerates the amplitude-modulated carrier in the form of a carrier which has undergone vestigial-sideband amplitude modulation with the video signal.

37. A multiplex transmission signal regeneration apparatus according to claim 32, further comprising a video signal source; and wherein said carrier regeneration circuit regenerates the amplitude-modulated carrier in the form of a carrier which has undergone vestigial-sideband amplitude modulation with the video signal.

38. A multiplex transmission signal regeneration apparatus according to claim 33, further comprising a video signal source; and wherein said carrier regeneration circuit regenerates the amplitude-modulated carrier in the form of a carrier which has undergone vestigial-sideband amplitude modulation with the video signal.

39. A multiplex transmission signal regeneration apparatus according to claim 34 further comprising a video signal source; and wherein said carrier regeneration circuit regenerates the amplitude-modulated carrier in the form of a carrier which has undergone vestigial-sideband amplitude modulation with the video signal.

40. A multiplex transmission signal regeneration apparatus according to claim 35, wherein said spectrum suppression processing signal regeneration circuit comprises an inversion circuit for applying inversion processing to the output signal of said synchronous detection circuit every other scanning period of the video signal.

41. A multiplex transmission signal regeneration apparatus according to claim 35, wherein said spectrum suppression processing signal regeneration circuit comprises an interruption circuit for interrupting the output signal of said synchronous detection circuit every other scanning period of the video signal.

42. A multiplex transmission signal regeneration apparatus according to claim 35, further comprising a video signal source; and wherein said spectrum suppression processing signal regeneration circuit comprises:
   a delay circuit for delaying the output signal of said synchronous detection circuit by the scanning period of the video signal;
   a subtraction circuit for applying subtraction processing to the output signal of said delay circuit and the output signal of said synchronous detection circuit; and an interruption circuit for interrupting the output of said subtraction circuit in accordance with the compressed period on a time base.

43. A multiplex transmission signal regeneration apparatus according to claim 35, wherein said spectrum suppression processing signal regeneration circuit comprises an inversion circuit for applying inversion processing to the output signal of said synchronous detection circuit every other horizontal scanning period of the video signal.

44. A multiplex transmission signal regeneration apparatus according to claim 35, wherein said spectrum suppression processing signal regeneration circuit comprises an interruption circuit for interrupting the output signal of said synchronous detection circuit every other horizontal scanning period of the video signal.

45. A multiplex transmission signal regeneration apparatus according to claim 35, further comprising a video signal source; and wherein said spectrum suppression processing signal regeneration circuit comprises:
   a delay circuit for delaying the output signal of said synchronous detection circuit by the horizontal scanning period of the video signal;
   a subtraction circuit for applying subtraction processing to the output signal of said delay circuit and the output signal of said synchronous detection circuit; and
   an interruption circuit for interrupting the output of said subtraction circuit in accordance with the compressed period on a time base.

46. A multiplex transmission signal regeneration apparatus according to claim 38, wherein said spectrum suppression processing signal regeneration circuit comprises:
   an inversion circuit for applying inversion processing to the output signal of said synchronous detection circuit every other horizontal scanning period of the video signal;
   first and second voltage comparison circuits supplied with the output signal of said inversion circuit;
   first and second reference voltage source for supplying comparison reference voltage to said first and second voltage comparison circuits; and
   a binary conversion circuit activated by the output signals of said first and second voltage comparison circuits.

47. A multiplex transmission signal regeneration apparatus according to claim 38, further comprising a video signal source; and wherein said spectrum suppression processing signal regeneration circuit comprises:
   an interruption circuit for interrupting the output signal of said synchronous detection circuit every other horizontal scanning period of the video signal;
   first and second voltage comparison circuits supplied with the output signal of said interruption circuit;
   first and second reference voltage sources for supplying comparison reference voltages to said first and second voltage comparison circuits; and
   a binary conversion circuit activated by the output signals of said first and second voltage comparison circuits.

48. A multiplex transmission signal regeneration apparatus according to claim 38, further comprising a video signal source; and wherein said spectrum suppression processing signal regeneration circuit comprises:
   a delay circuit for delaying the output signal of said synchronous detection circuit by the scanning period of the video signal;
   a subtraction circuit for applying subtraction processing to the output signal of said delay circuit and the output signal of said synchronous detection circuit;
   an interruption circuit for interrupting the output of said subtraction circuit in accordance with the compressed period on a time base;
   first and second voltage comparison circuits supplied with the output signal of said interruption circuit;
   first and second reference voltage sources for supplying comparison reference voltages to said first and second voltage comparison circuits; and
   a binary conversion circuit activated by the output signals of said first and second voltage comparison circuits.

49. A multiplex transmission signal regeneration apparatus according to claim 38, wherein said spectrum suppression processing signal regeneration circuit comprises:
   a delay circuit for delaying the output signal of said synchronous detection circuit;
   a computation circuit for applying subtraction processing to the output signal of said delay circuit and the output signal of said synchronous detection circuit;
   a positive pulse discrimination circuit for detecting a positive pulse in the output signal of said computation circuit;
   a negative pulse discrimination circuit for detecting a negative pulse in the output signal of said computation circuit;
   a clock regeneration circuit for regenerating a transmission clock from the output signal of said computation circuit;
   a positive code discrimination circuit for discriminating the code of the output signal of said positive pulse discrimination circuit by the output signal of said clock regeneration circuit;
   a negative code discrimination circuit for discriminating the code of the output signal of said negative pulse discrimination circuit by the output signal of said clock regeneration circuit;
   a first changeover circuit for passing only necessary information in the output signal of said positive code discrimination circuit;
   a second changeover circuit for passing only necessary information in the output signal of said negative code discrimination circuit;

a first time base expansion circuit for expanding on a time base the output signal of said first changeover circuit;

a second time base expansion circuit for expanding on the time base the output signal of said second changeover circuit; and a binary conversion circuit supplied with the output signals of said first time base expansion circuit and said second time base expansion circuit.

50. A multiplex transmission signal regeneration apparatus for receiving and regenerating a transmitted multiplex transmission signal obtained by combining an amplitude-modulated carrier signal with a quadrature signal having a quadrature phase with respect to said carrier signal and modulated by a multiplex signal so processed in spectra as to suppress signal components located near the carrier signal frequency, comprising:

a first frequency conversion circuit for performing frequency conversion on the transmitted multiplex transmission signal;

a detection circuit for detecting the output signal of said first frequency conversion circuit and demodulating the amplitude-modulated signal;

a second frequency conversion circuit for further applying frequency conversion to the output signal of said first frequency conversion circuit;

a carrier regeneration circuit for regenerating the carrier signal from the output signal of said second frequency conversion circuit;

a synchronous detection circuit for applying synchronous detection with the output signal of said carrier regeneration circuit to the output signal of said second frequency conversion circuit; and a spectrum suppression processing signal regeneration circuit for demodulating the multiplex signal from the output signal of said synchronous detection circuit.

* * * * *